[12] United States Patent
Asam et al.

(10) Patent No.: US 8,973,037 B2
(45) Date of Patent: Mar. 3, 2015

(54) INTUITIVE IMAGE-BASED PROGRAM GUIDE FOR CONTROLLING DISPLAY DEVICE SUCH AS A TELEVISION

(71) Applicants: Aravind Babu Asam, San Diego, CA (US); Tracy Barnes, San Diego, CA (US); Hye Hoon Yi, Escondido, CA (US); Satoshi Ishiguro, San Diego, CA (US); Dongwook Kim, Chula Vista, CA (US); Tanmay Agnihotri, San Diego, CA (US); Milton Massey Frazier, San Marcos, CA (US)

(72) Inventors: Aravind Babu Asam, San Diego, CA (US); Tracy Barnes, San Diego, CA (US); Hye Hoon Yi, Escondido, CA (US); Satoshi Ishiguro, San Diego, CA (US); Dongwook Kim, Chula Vista, CA (US); Tanmay Agnihotri, San Diego, CA (US); Milton Massey Frazier, San Marcos, CA (US)

(73) Assignee: Sony Corporation, Tokyo (JP)

( * ) Notice: Subject to any disclaimer, the term of this patent is extended or adjusted under 35 U.S.C. 154(b) by 55 days.

(21) Appl. No.: 13/841,615

(22) Filed: Mar. 15, 2013

(65) Prior Publication Data

US 2014/0089979 A1    Mar. 27, 2014

Related U.S. Application Data

(63) Continuation-in-part of application No. 13/606,245, filed on Sep. 7, 2012.

(60) Provisional application No. 61/671,890, filed on Jul. 16, 2012.

(51) Int. Cl.
*G06F 3/00* (2006.01)
*H04N 21/482* (2011.01)
*H04N 21/422* (2011.01)
*H04N 21/472* (2011.01)
*H04N 21/4788* (2011.01)

(52) U.S. Cl.
CPC ......... *H04N 21/482* (2013.01); *H04N 21/4222* (2013.01); *H04N 21/472* (2013.01); *H04N 21/4788* (2013.01); *H04N 21/42224* (2013.01)
USPC ................... 725/39; 725/40; 725/41; 725/42; 725/47

(58) Field of Classification Search
None
See application file for complete search history.

(56) References Cited

U.S. PATENT DOCUMENTS

| | | | |
|---|---|---|---|
| 6,020,930 A * | 2/2000 | Legrand | 725/41 |
| 7,929,056 B2 * | 4/2011 | Tang et al. | 348/556 |
| 2003/0093329 A1 | 5/2003 | Gutta | |
| 2008/0134053 A1 | 6/2008 | Fischer | |
| 2010/0094866 A1 | 4/2010 | Cuttner et al. | |
| 2010/0287033 A1 | 11/2010 | Mathur | |
| 2011/0283320 A1 | 11/2011 | Levin et al. | |
| 2012/0054795 A1 * | 3/2012 | Kang et al. | 725/40 |
| 2012/0284753 A1 * | 11/2012 | Roberts et al. | 725/45 |
| 2014/0114978 A1 * | 4/2014 | Chatterjee et al. | 707/739 |

FOREIGN PATENT DOCUMENTS

KR    20140093121    7/2014

* cited by examiner

*Primary Examiner* — Cai Chen
(74) *Attorney, Agent, or Firm* — John L. Rogitz

(57) ABSTRACT

A control device such as a tablet computer presents a scrollable image-based program guide (IBPG) on a display that a user can swipe to cause the device to command a display device to present an audio video (AV) program represented by the image. The IBPG is a subset of an electronic program guide (EPG) from a TV signal provider. Social networking information (SNI) related to a video program is presented on or adjacent an image in the IBPG representing the program.

25 Claims, 23 Drawing Sheets

User Interface Visual Flow

US 8,973,037 B2

INTUITIVE IMAGE-BASED PROGRAM GUIDE FOR CONTROLLING DISPLAY DEVICE SUCH AS A TELEVISION

This is a continuation-in-part of U.S. patent application Ser. No. 13/606,245, filed Sep. 7, 2012, which claims priority from U.S. provisional patent application 61/671,890, filed Jul. 16, 2012. Priority is claimed to both of these applications.

I. FIELD OF THE INVENTION

The present application relates generally image-based program guides for controlling display devices such as televisions.

II. BACKGROUND OF THE INVENTION

Modern TVs such as the Sony Bravia (trademark) present native user interfaces (UI) to allow viewers to select an audio video (AV) input source, to launch non-broadcast TV applications such as video telephone applications (e.g., Skype), and so on. As understood herein, one of the most-used applications is the electronic program guide (EPG). Originally presented on a TV display in list format, contemporary EPGs may also include interactive features that augment the list.

As understood herein, people tend to react more intuitively and naturally to visible, graphic cues regarding underlying content, whereas existing EPGs present mostly alpha-numeric program lists. Present principles further understand that EPGs typically list hundreds of channels and programs, most of which the typical viewer will never have any desire to see, yet the viewer must scroll through these otherwise uninteresting channels to locate programs of interest. Present principles further recognize that social networking user reactions to TV shows can be an important source of information to many TV viewers.

SUMMARY OF THE INVENTION

Accordingly, a device includes a display, a processor controlling the display to present an image-based program guide (IBPG) on the display, and a computer readable storage medium accessible to the processor and bearing instructions executable by the processor to cause the processor to generate a channel list by testing channels in an electronic program guide (EPG) from a TV signal provider to determine whether channels in the EPG are identified in a local favorite's list. Responsive to a determination that a channel in the EPG is in the local favorite's list, a favorites weight is applied to the channel. Also, responsive to a determination that a channel in the EPG is present in a local history list of previously viewed channels, a history weight is applied to the channel. Moreover, responsive to a determination that a channel in the EPG is in a favorite's list of a social networking friend affiliated with a user of the device, a friend's favorite weight is applied to the channel, while responsive to a determination that a channel in the EPG is present in a history list of previously viewed channels of a social networking friend affiliated with a user of the device, a friend's history weight is applied to the channel. The channel list is established based on the weights and is a subset of less than all of the channels on the EPG. For each channel, a respective photograph-based image is established and the images are arranged in the IBPG, with each image being selectable to cause an AV program associated with the respective channel to be presented on a display device.

In some embodiments the device is a control device different from the display device, with the control device communicating wirelessly with the display device. If desired, a first image has a first size and a second image has a second size different from the first size, and the sizes are established based at least in part on one or more of the weights.

In example implementations the images of the IBPG scroll across the display automatically. The display may be a touch screen display and the processor can cause the images of the IBPG to scroll across the display responsive to a determination that a person has made a motion against the display in a first linear dimension. In specific embodiments the processor causes a command to be sent to a display device to present an AV program affiliated with a first image of the IBPG responsive to a determination that a person has made a motion against the display in an area occupied by the first image in a second linear dimension different from the first linear dimension. Also, the processor can cause metadata to appear on respective images containing alpha-numeric information pertaining to respective programs associated with the images responsive to a determination that a person has tapped a first tap the display.

If desired, the processor enlarges an image responsive to a determination that a person has entered a second tap on the image after the first tap. The processor may also present additional metadata responsive to a determination that a person has entered a second tap on the image. In some examples, responsive to a determination that a person has made a motion against the display in an area occupied by the first image in the second linear dimension the processor animates the first image to rotate and to move translationally along the second dimension while rotating.

In some embodiments, the IBPG includes a share selector selectable to cause a share window to appear on the IBPG. The share window enables a user to enter a comment and to select a social networking site on which to share the comment.

If desired, an image in the IBPG represents an advertisement, and the image is established in the IBPG based at least in part on past user history in selecting the advertisement. In other examples, an image in the IBPG represents an advertisement, and the image is established in the IBPG based at least in part on recommendations pertaining to the advertisement on a social network associated with a user of the device, and/or based at least in part on a general popularity metric of the advertisement, and/or based at least in part a contractual relationship between an entity affiliated with the advertisement and a manufacturer of the device.

In another aspect, a method includes presenting a scrollable arrangement of images on a display of a device. The images establish an image-based program guide (IBPG) on the display, and represent respective channels in an electronic program guide (EPG) from a TV signal provider. Channels are selected for inclusion on the IBPG based on preference information of a user of the device and/or information pertaining to preferences of friends of the user on social networking sites. Typically, the IBPG contains fewer programs than the EPG. Responsive to selection of a first image, a display device is commanded to present an audio video (AV) program associated with the first image.

In another aspect, a control device has a processor, a touch sensitive display controlled by the processor, and a wireless transmitter communicating with the processor. The processor is programmed with instructions to present a scrollable image-based program guide (IBPG) on the display that a user can swipe to cause the processor to command, using the wireless transmitter, a display device to present an audio video (AV) program represented by an image swiped by the user. The IBPG is a subset of an electronic program guide (EPG) from a TV signal provider, and is populated using user history and favorites information and social networking site history and favorites information.

In an embodiment involving the presentation of social network information, a device includes a display, a processor programmed with instructions for controlling the display, and a computer readable storage medium accessible to the processor and bearing instructions executable by the processor to cause the processor to, for at least one video program, establish a respective photograph-based image. The processor is programmed to access a wide area network to obtain social networking information (SNI) related to the video program, and to juxtapose at least some of the SNI related to the video program with the photograph-based image.

In example embodiments the processor is configured with instructions to obtain the SNI directly from one or more social networking servers. In another embodiment the processor is configured with instructions to obtain the SNI from a server that aggregates social networking information.

The image can be selectable to cause an AV program associated with the image to be presented on the display device. The processor can be programmed with instructions to establish respective photograph-based images for plural programs and arranges the images in an image based program guide (IBPG).

As disclosed in greater detail below, the SNI can include a numeral indicating a volume of social network comments that have been transmitted by social network users concerning the video program. Additionally or alternatively, the SNI may include at least one conversation topic related to the program, and the conversation topic can be established by a social networking hash tag. The processor can be programmed with instructions to respond to user selection of a topic by causing a string of social networking comments to be presented on the display, with the string of social networking comments being related to the topic.

Yet again, the SNI may include a "Top influencers" field established by at least one social networking account messages from which reach a relatively wide audience. Still further, the SNI can include a "Sentiment" meter depicting positive and/or negative sentiment about the program based on social networking comments.

The SNI can be presented in a SNI pane that extends along a bottom portion of the image to which the SNI pertains, at least partially overlaying the image. Or, the SNI can be presented in a SNI pane that is attached to a portion of the image frame substantially without obscuring any part of the image, with only a small pointer perhaps unobtrusively overlaying the image.

In some implementations the processor is programmed with instructions to use the SNI as a search term to access a computer network with a query based on the search term and to present on the display at least one search result item selectable by a user to cause the processor to access and play a video represented by the result item. In some implementations the processor is programmed with instructions to present on the display at least one time-based graph illustrating a volume of social networking comments pertaining to the program as a function of time. The processor can respond to a user selection of a part of the graph by causing a recording device associated with the display and recording the program to immediately play back the program starting at a time represented by the part of the graph selected by the user. An alpha-numeric label derived from the SNI may be juxtaposed with a peak on the graph an associated In another aspect of a SNI embodiment, a method includes presenting a scrollable arrangement of images on a display of a device, with the images establishing an image-based program guide (IBPG) on the display. The images represent respective channels in an electronic program guide (EPG) from a TV signal provider. The method also includes presenting social networking information (SNI) related to a video program on or adjacent an image in the IBPG representing the program.

In another aspect of a SNI embodiment, a control device includes a processor and a touch sensitive display configured for being controlled by the processor. The processor is programmed with instructions to present a scrollable image-based program guide (IBPG) on the display, and present social network information (SNI) pertaining to at least one program represented in the IBPG on the display. The processor uses the SNI as a search term to access a computer network with a query based on the search term and presenting on the display at least one search result item selectable by a user to access and play a video represented by the result item. In addition or alternatively, the processor presents on the display a time-based graph illustrating a volume of social networking comments pertaining to the program as a function of time. A user selection of a part of the graph causes a recording device associated with the display and recording the program to play back the program starting at a time represented by the part of graph selected by the user.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1A:
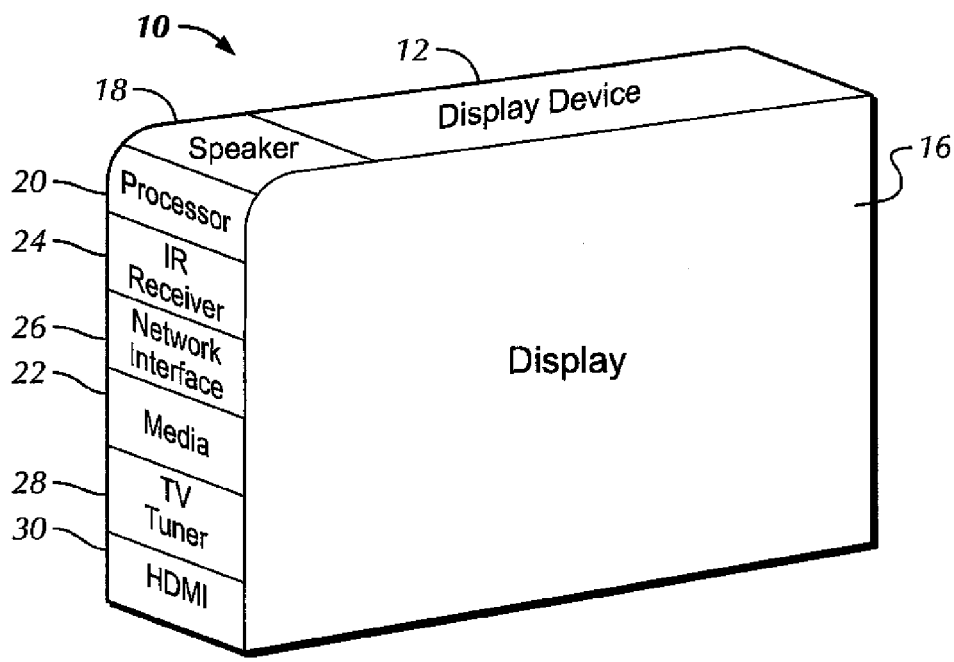
FIG. 1 is a block diagram of a non-limiting example system in accordance with present principles.
Figure 1B:
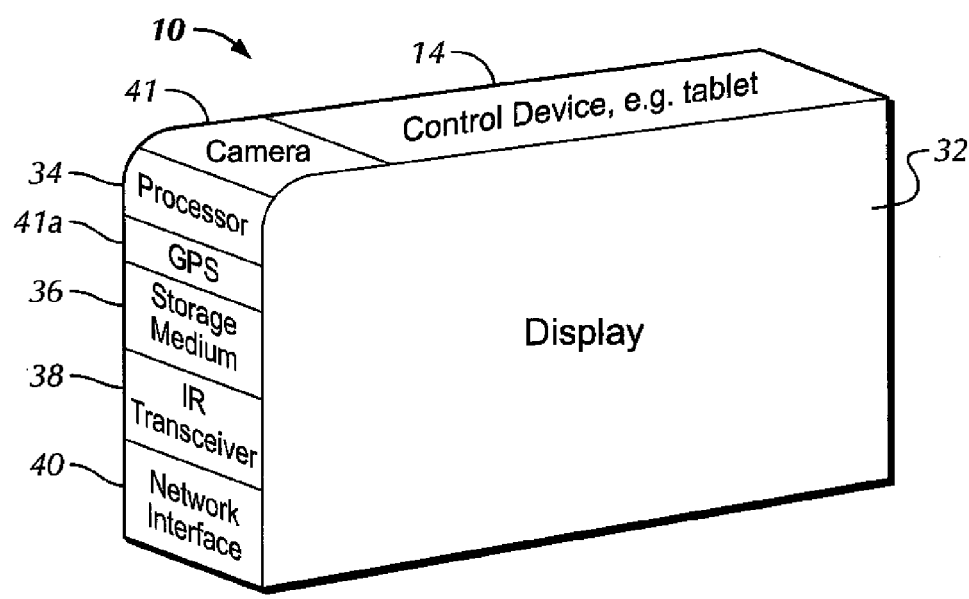
Figure 2:
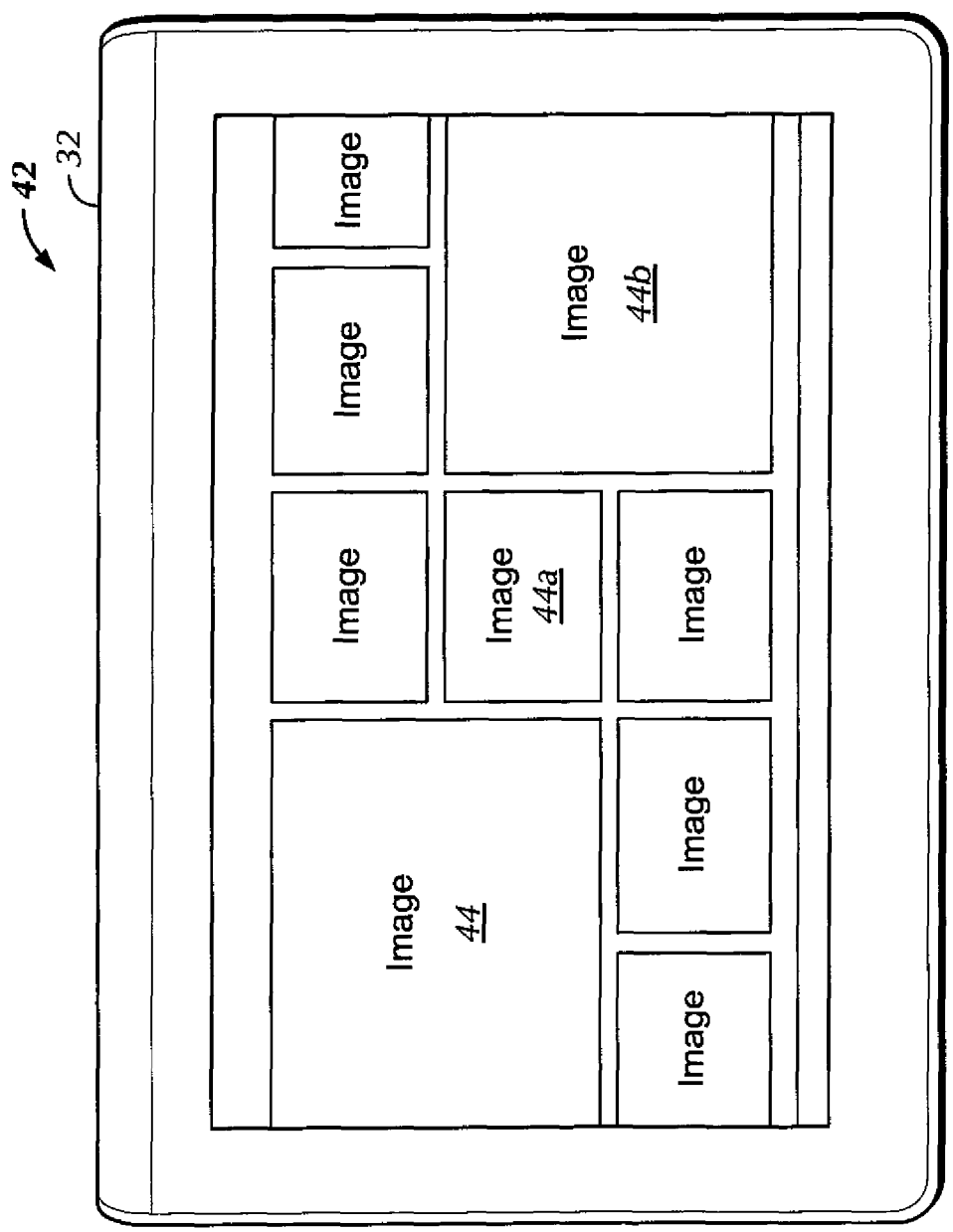
FIGS. 2-10 are screen shots illustrating various example aspects of the image-based program guide.

Referring initially to the non-limiting example embodiment shown in FIG. 1, a system is shown, generally designated 10, which includes a display device 12 such as but not limited to TV and a control device 14 such as but not limited to a tablet computer. Other control devices may be used such as but not limited to smart phones, personal computers, personal digital assistants, game consoles, and the like, and other display devices may be used such as but not limited home theater systems. Note that while the example in FIG. 1 illustrates a control device 14 for presenting an image-based program guide for controlling presentation of content presented on a display device 12, in other implementations the content may be presented on the control device 14 without necessarily controlling a display device, and/or the image-based program guide (IBPG) may be presented on the display device 12 which may have, e.g., a touch screen display.

In the example shown for illustration, the display device 12 includes a video display 16 such as a standard definition (SD) or high definition (HD) matrix display. The display device 12 may also have one or more audio speakers 18, with the content output on the display 16 and speakers 18 typically being controlled by a processor or processors 20 accessing one or more computer readable storage media 22 such as but not limited to solid state storage, disk storage, and the like. The processor may receive volume commands, channel commands, trick play commands, tuning commands, input source commands, and the like via an infrared (IR) receiver 24, and may communicate with a wide area network such as the Internet or local area network via a network interface 26 such as a wired or wireless modem. When the display device 12 is a TV it typically includes a TV tuner 28 communicating with the processor 20. When the display 16 is a HD display the display device 12 may include HD multimedia interfaces (HDMI) 30 communicating with respective sources of audio video (AV) content such as game consoles, disk players, personal video recorders, and the like for receiving respective content therefrom.

The control device 14 includes a video display 32 such as a touch screen display. While a touch screen display is envisioned in the non-limiting example shown as the input device for disclosure purposes, other input devices may be used, e.g., keyboards, keypads, point-and-click devices, voice recognition software, etc. The control device 14 may also have one or more processor or processors 34 accessing one or more computer readable storage media 36 such as but not limited to solid state storage, disk storage, and the like. The processor may send commands to the display device 12 via an infrared (IR) transceiver 38, and may communicate with a wide area network such as the Internet or local area network via a network interface 40 such as a wired or wireless modem. An imaging device 41 such as a camera may be mounted on the control device 14 to communicate image signals to the processor 34. Also, a position receiver 41A such as a global positioning satellite (GPS) receiver may receive position information and communicate it to the processor 34.

FIGS. 2-9 show various aspects of an IBPG 42. As shown, the IBPG 42 is established by a grid of individual image frames 44 that border each other, most or all of which are photograph-based, e.g., are based on joint photographic experts group (JPEG) images, either real life or cartoon images as shown at 44A. Each image frame may be a rectilinear frame as shown, and as will be discussed further below, some image frames (e.g., 44B) are larger than other image frames (e.g., 44A). Each image frame is selectable to cause the control device 14 and/or display device 12 to present respective audio video (AV) content from a source such as a TV channel that is associated with the selected frame. Typically, the AV content is from a TV signal source such as but not limited to a terrestrial broadcaster, satellite source, cable source and the like, it being understood that some of the AV content may be sourced from, e.g., the Internet, a peer device, a social networking site, and the like. In any case, if desired, the IBPG 42 does not include alpha-numeric indications of a TV channel source for the underlying AV program, unlike conventional EPGs, but only a pictoral image representing the AV program/channel.

In one implementation, the image frames 44 scroll as a unit across the display 32 continuously, for example right to left, absent user intervention in an endless carousel-like loop. As also discussed further below, the number of image frames (and, hence, number of channels selectable using the IBPG 42) is less than the number of channels on an electronic program guide (EPG) from which the IBPG 42 is derived, and may be user-selectable, e.g., the number of frames may be limited to fifty, one hundred, or some other user-defined number, and/or the number of frames may be limited to represented a subset of channels in a spectrum, e.g., limited to only channel numbers 2-100, or 101-200, and so on.

Figure 3:
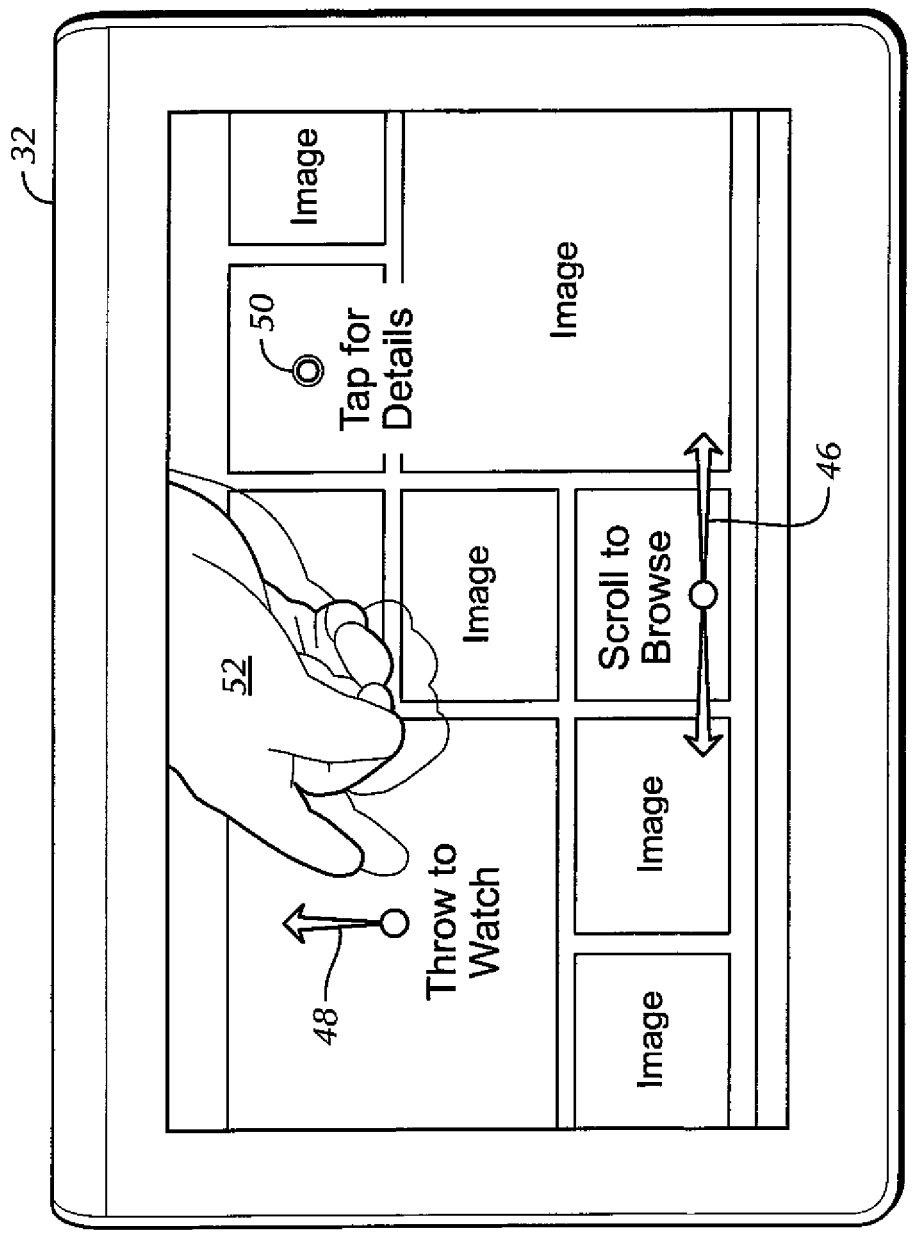

FIG. 3 illustrates various touch gestures against the touch screen display 32 that may be used for example commands when the input device is the touch screen. As shown by the double arrows 46, hand or finger motion against the display 32 in a first dimension, in this case, in the left-to-right dimension relative to a user looking down on the display 32, causes the IBPG 42 to scroll left (when hand motion is to the left) and right (when hand motion is to the right). The speed of scrolling may be proportional to the speed of the hand stroke.

On the other hand, as shown by the arrow 48, a hand gesture from bottom to top of the display 32 may be used to "throw" an image frame 44 to the display device 12, it being readily appreciated that the gesture is hand motion away from the user as if tossing an object. What this means is that the control device processor 34 interprets the gesture represented by the arrow 48 to mean "play the underlying video" associated with the image frame 44 over which the user made the gesture. In response, the control device 14 sends a wireless (e.g., IR) command signal to the display device 12 to immediately tune to the source of the AV content associated with the image frame 44 over which the user made the gesture and play the content.

Note that a user may make the throw gesture over multiple image frames 44. In this case, the control device 14 signals to the display device 12 to simultaneously present the respective AV content in split screen or picture-in-picture format on the display device 12.

Figure 4:
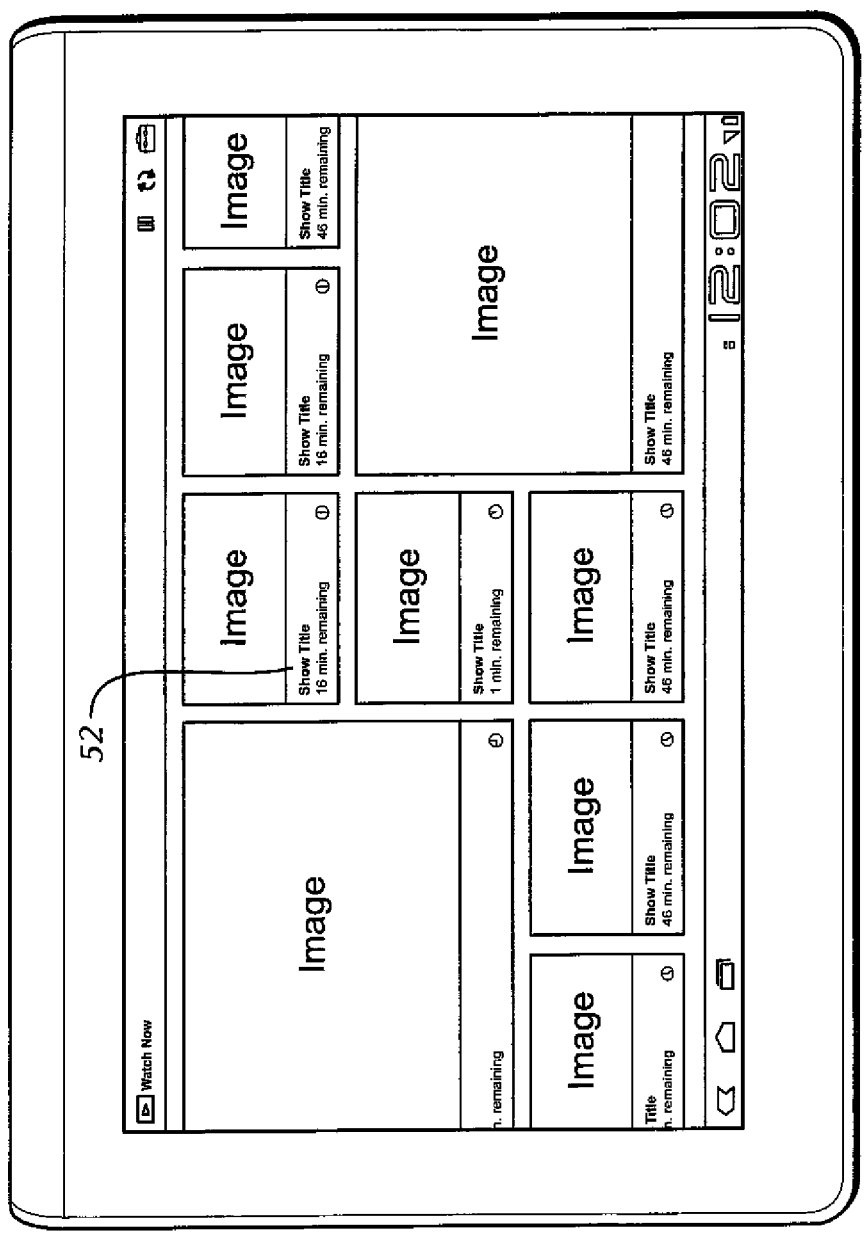

Yet again, as indicated by the dot 50, a tap (without translational motion) on the display 32 indicates to the processor 34 to overlay metadata onto the image frames 44 to render the display shown in FIG. 4. Note that the arrows 46, 48, dot 50, hand image 52, and corresponding alphabetic instructions under the arrows and dot may actually be shown on the display 32, e.g., the first time after powering up subsequent to purchase, to inform the viewer as to what gestures should be used for what commands.

Turning to FIG. 4, responsive to a single press, as shown at 52 metadata appears on each image 44 indicating the title and time remaining for each respective video represented by an image frame 44. After a predetermined period since the single press, the metadata 52 may fade from view, resuming the appearance of the IBPG shown in FIG. 2.

Figure 5:
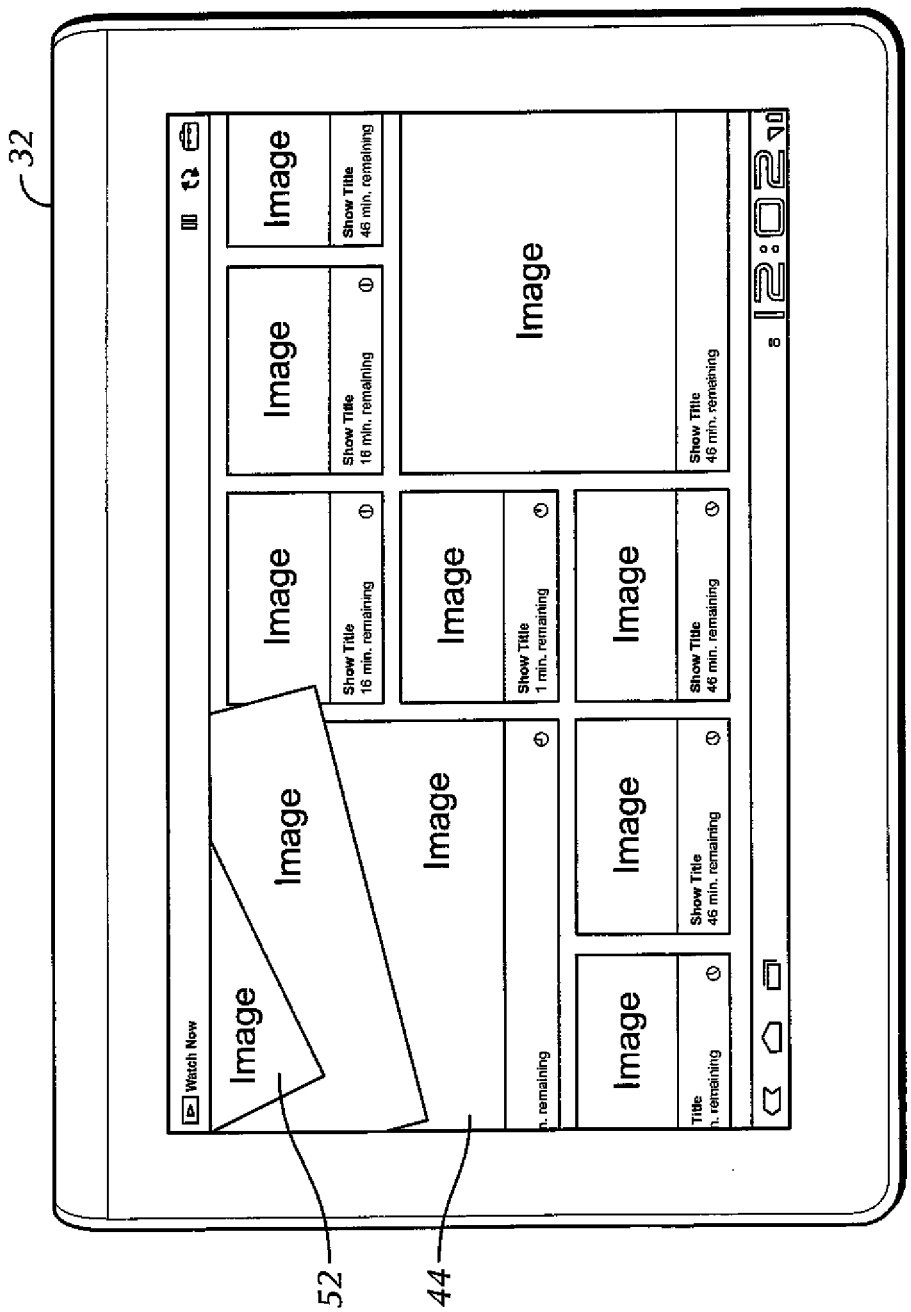

Recall that the "throw" gesture results in the control device 14 commanding the display device 12 to present an AV program associated with the "thrown" image frame 44. FIG. 5 illustrates that in addition, responsive to a "throw" gesture the control device 14 can present an animation of the thrown image frame 44 as indicated at 54. In the example shown, the thrown image frame 44 is caused to rotate on an imaginary left-to-right axis while it translating upwardly on the display 32.

Figure 6:
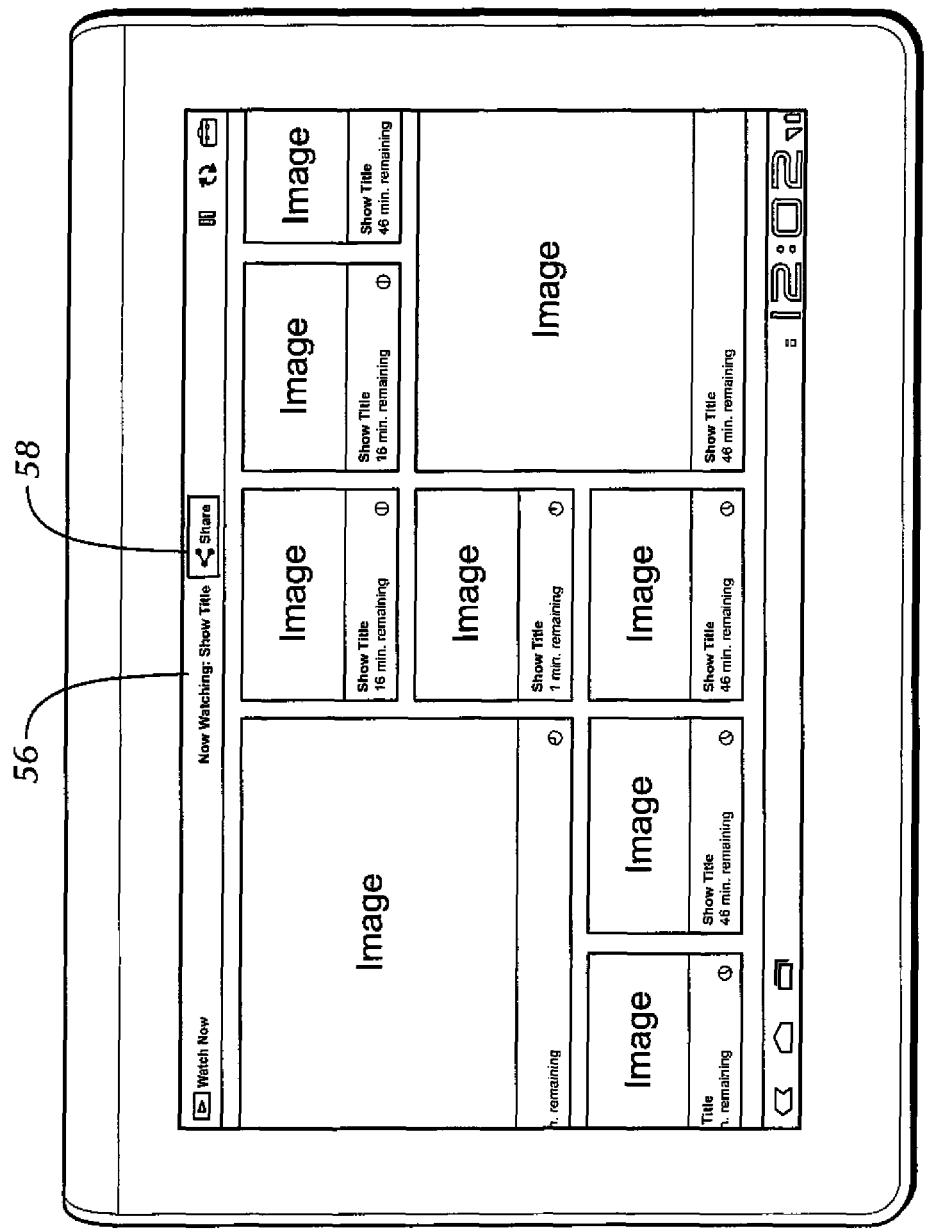

Still further, after the command is sent to the display device 12 and the thrown image frame 44 animation has been executed, FIG. 6 shows that the IBPG then indicates by a "now watching" message 56 that the display device 12 has been commanded to play the AV content associated with the "thrown" image frame 44. Additionally, a share selector 58 appears which can be selected to share the "thrown" program on social networking computer sites.

Figure 7:
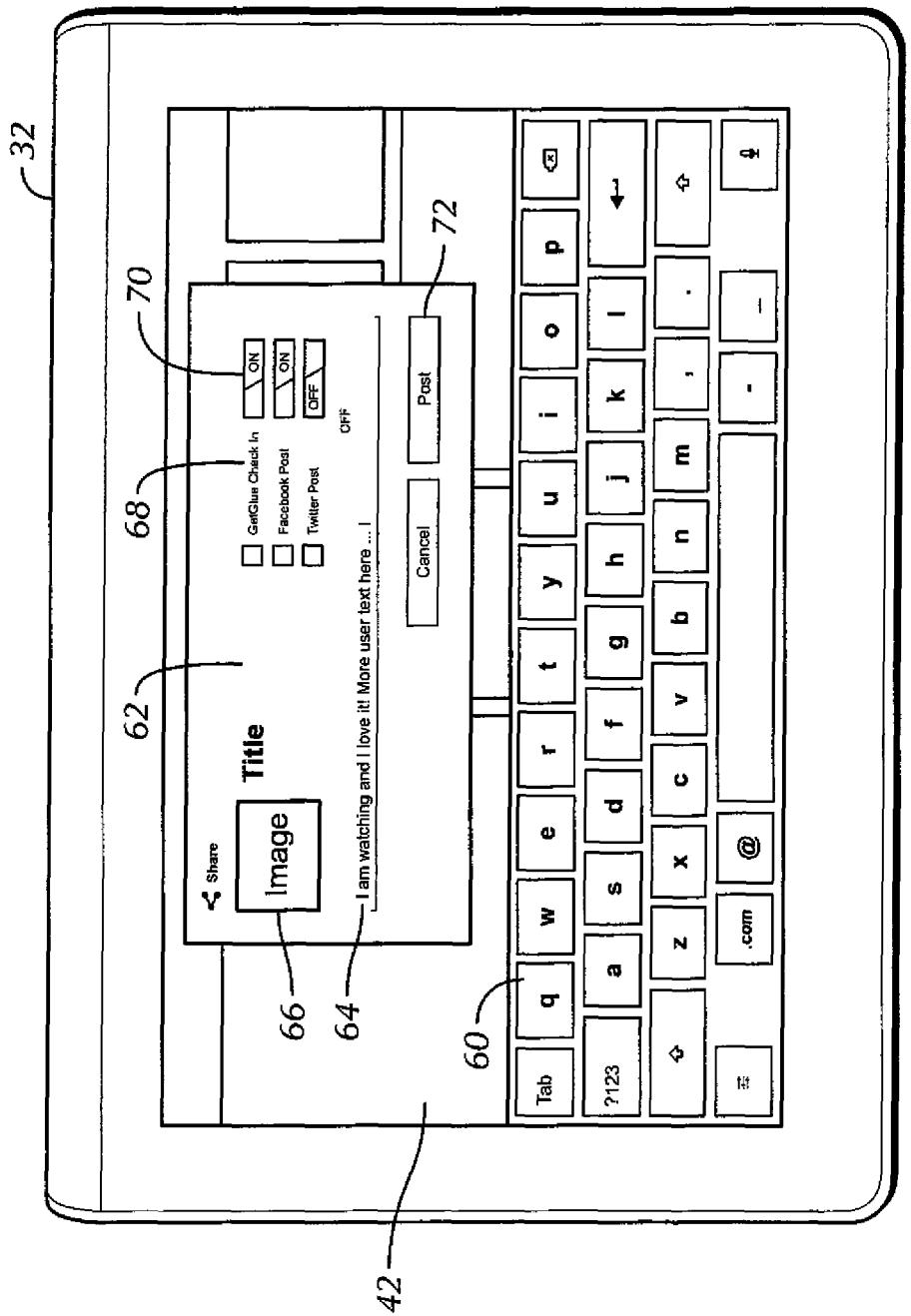
Figure 8:
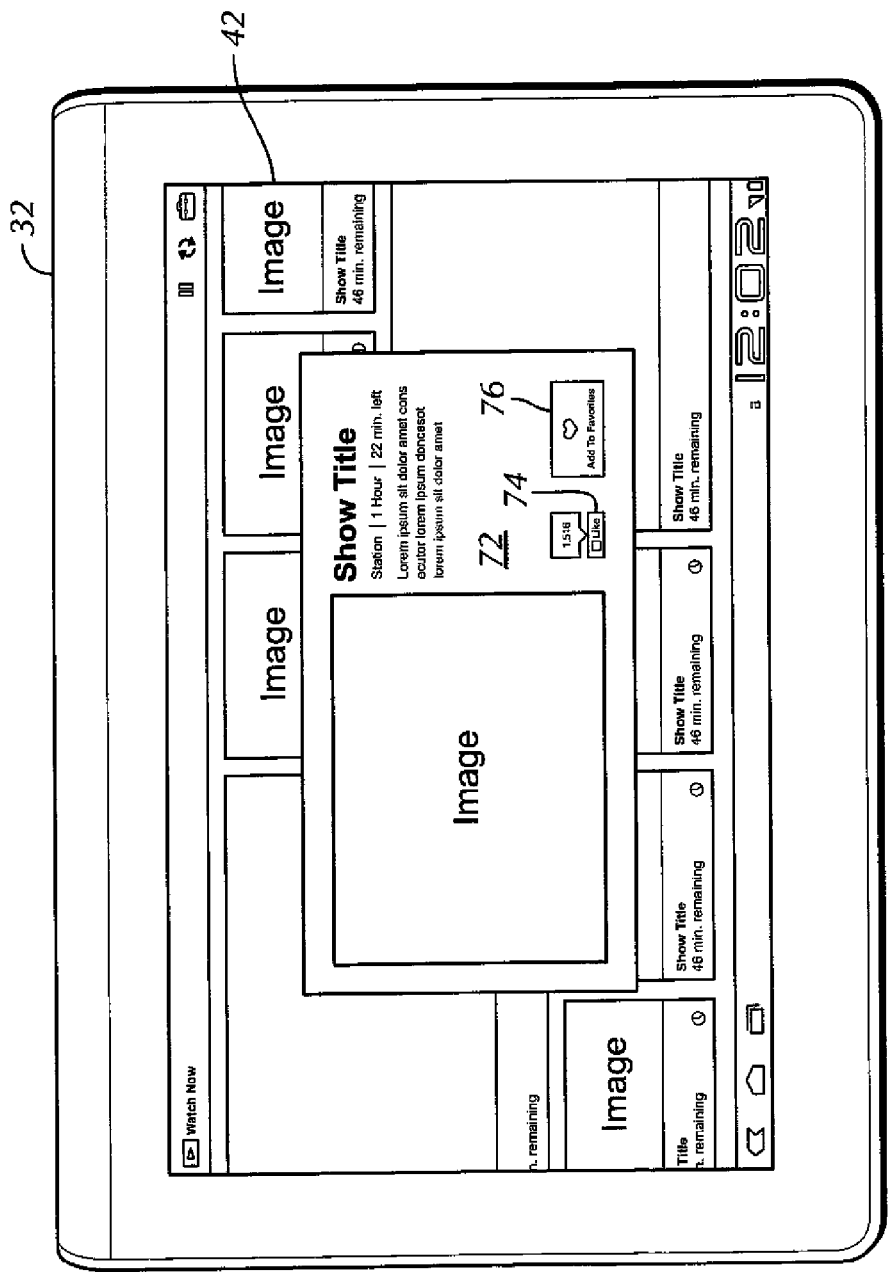

FIG. 7 shows the results in one embodiment of selecting the share selector 58. The image frames 44 of the IBPG 42 are grayed down (but still visible), and an image 60 of an input device such as a keyboard is overlaid on the IBPG 42. A user can enter alpha numeric characters by touching the display 32 at the locations over which the desired keys of the image 60 are overlaid.

Moreover, a share window 62 is overlaid on the grayed down IBPG 42. Text entered by means of the input device image 60 is entered in a text entry area 64 of the share window 62. The share window 62 also contains a miniature image 66 of the thrown image frame 44.

To enable the user to select people with whom to share the entered text and if desired miniature image of the thrown program, a list 68 of social networking sites may be presented along with respective toggle indicators 70 enabling a user to select ("on") or deselect ("off") by touching the indicators. When a post selector 72 is selected, the user's comments in the text entry area 64 are sent to the user's friends on the selected networking sites. To this end, it will readily be appreciated that the control device processor 34 accesses the user's various social networking friends lists, typically stored on the storage medium 36.

Responsive to a second tap on an image frame 44 or other signal, as shown in FIG. 8 the IBPG is once again grayed down and an additional program information window 72 is superimposed over the IBPG. As shown, the additional program information window 72 includes further details beyond the metadata 52 shown in FIG. 4, in the example shown, a show summary and an indication of which network the show has been selected on. Moreover, a "like" selector 74 appears on the example additional program information window 72 which can be selected to indicate that the user likes the program. An indication may also be provided as shown indicating how many other people input "like" recommendations.

Additionally, a favorites selector element 76 may be presented on the additional program information window 72. Selecting this element 76 causes the channel represented by the selected image frame 44 to be added to a favorites data structure stored in, e.g., the memory 36.

Figure 9:
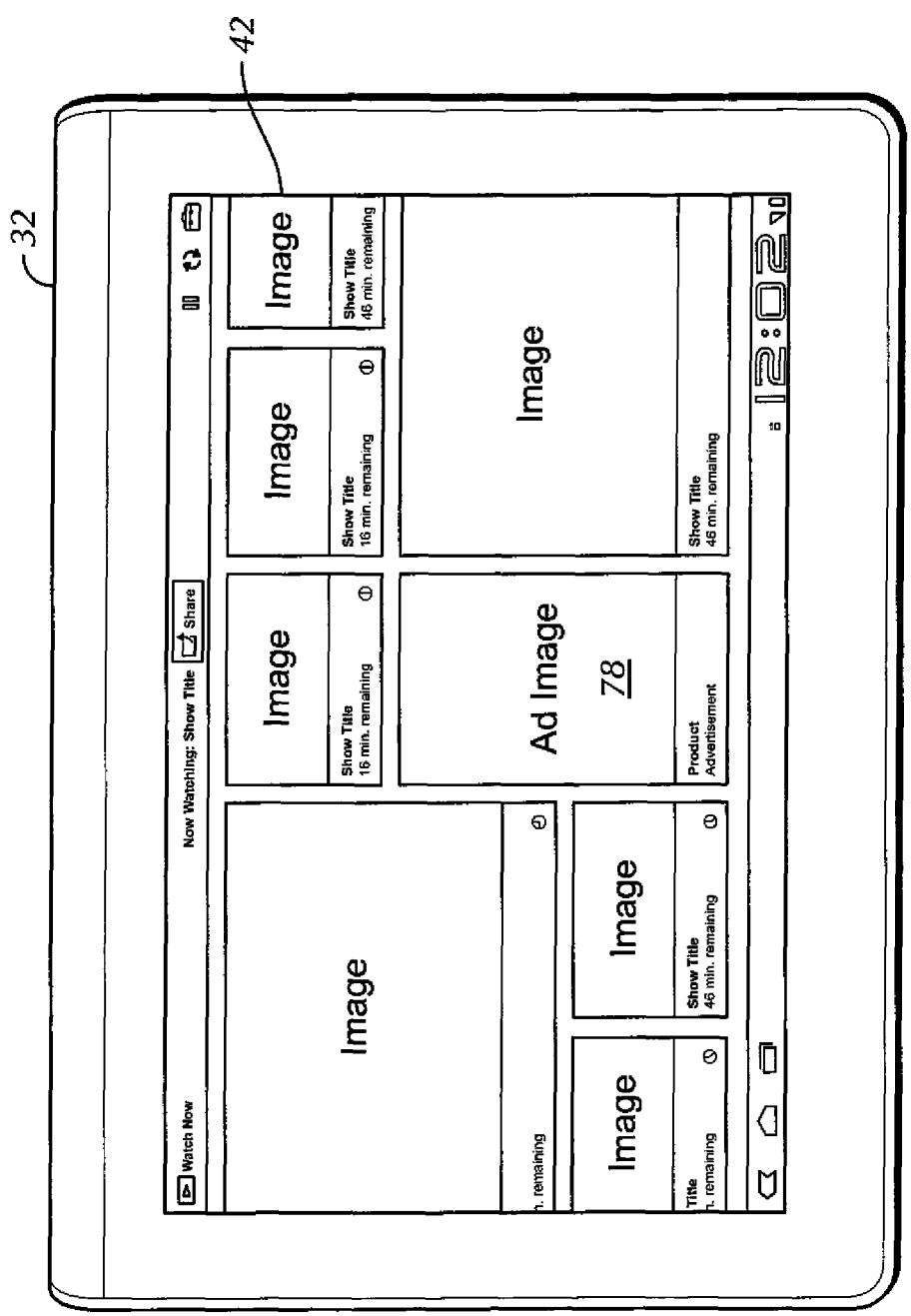
Figure 10:
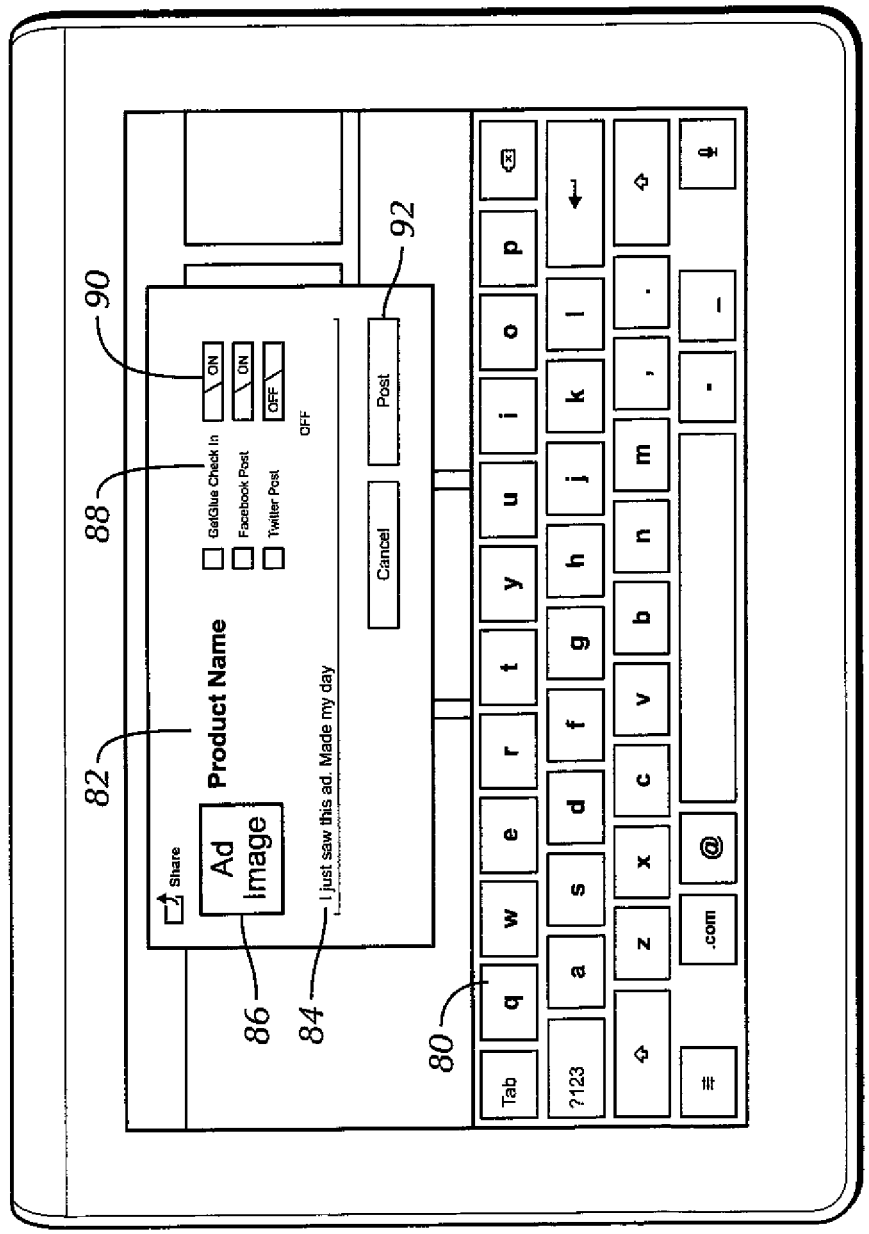
Figure 11:
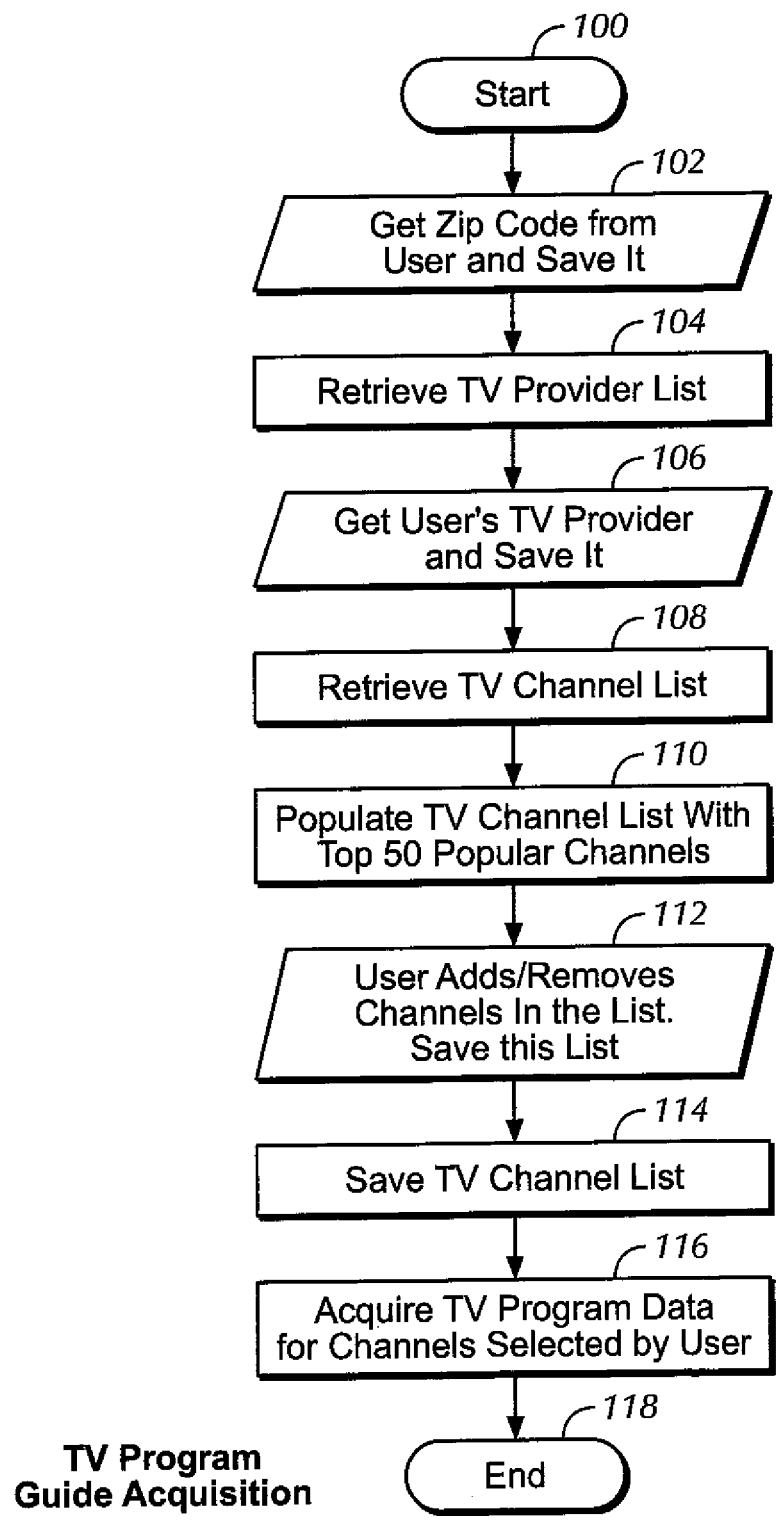
FIGS. 11-14 are flow charts illustrating an example method for generating the image-based program guide.

In addition to image frames 44 representing AV programs such as TV channel programs, FIGS. 9 and 10 show that one or more advertisement frames 78 may be included in the IBPG 42. Further description below explains how the advertisements are selected for population into the IBPG. Selecting the advertisement frame 78 shown in FIG. 9 causes the IBPG 42 to be grayed down as shown in FIG. 10 and an image 80 of an input device such as a keyboard to appear by means of which a user can input comments along the lines discussed above into an advertisement window 82, also overlaid on the grayed down IBPG.

Text entered by means of the input device image 80 is entered in a text entry area 84 of the window 82. The window 82 also contains a miniature image 86 of the selected advertisement.

To enable the user to select people with whom to share the entered text and if desired miniature image of the advertisement, a list 88 of social networking sites may be presented along with respective toggle indicators 90 enabling a user to select ("on") or deselect ("off") by touching the indicators. When a post selector 92 is selected, the user's comments in the text entry area 84 are sent to the user's friends on the selected networking sites. To this end, it will readily be appreciated that the control device processor 34 accesses the user's various social networking friends lists, typically stored on the storage medium 36.

Now referring to FIGS. 11-14 for explanation of one example embodiment for how the control device 14 populates the IBPG 42, starting at state 100 the logic executed by the processor 34 moves to state 102 to obtain geographic location information of the control device 14. In one example, this is done by presenting a prompt on the display 32 for the user to enter his postal code. In other examples, location information may be retrieved from the position receiver 41A and correlated to a zip code.

In any case, once the user's location is known, at state 104 the user's TV provider list for the user's location is obtained, e.g., over the Internet, and then at state 106, the list is saved. At state 108 the electronic program guide (EPG) of the TV provider is obtained, either over the Internet or over a TV EPG channel source.

Moving to block 110, the IBPG 42 is populated with a subset of less than all of the channels on the EPG. In one implementation, the IBPG is populated with the N most popular channels according to disclosure below, wherein N is a default and/or user-selected integer, e.g., fifty (50). As indicated above, however, if the user elects to populate the IBGT with a group of channels from the EPG, e.g., only channel numbers 1-100, then that group of channels establishes the IBPG.

At block 112, the user is allowed to remove channels in the list. This may be effected in a number of ways. For instance, a setup menu may present an alpha-numeric list of the channels in the IBPG from which the user can select to prune a channel.

The list is then saved at state 114. Next, at block 116 program data is acquired for each of the remaining channels on the IBPG. The logic ends at state 118.

Figure 12:
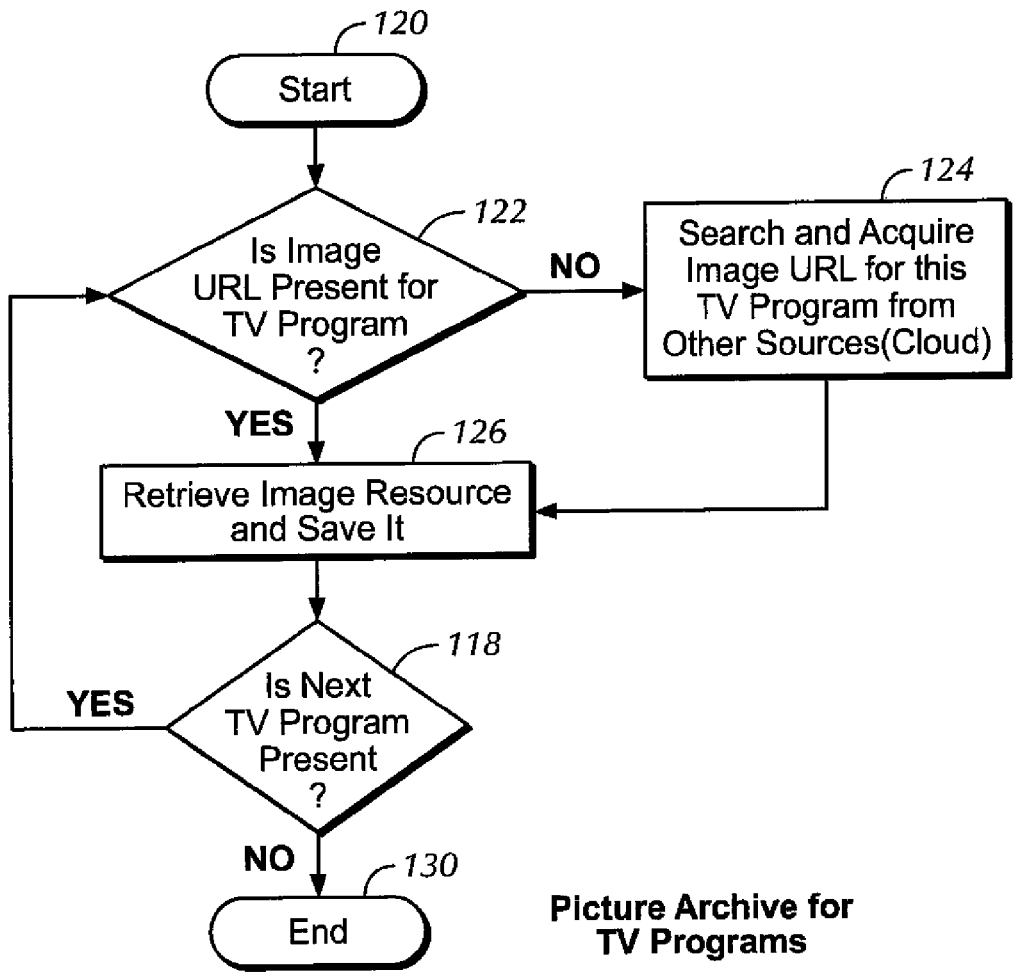

Starting at state 120 in FIG. 12, the logic moves to decision diamond 122 to determine, for a first channel in the IBPG, whether an associated image is present in storage 36 to establish the corresponding image frame 44 of the IBPG. If it is not, the logic moves to block 124 to search for an image for the current program on the channel under test. This may be executed by the processor 34 accessing a search engine on the Internet and entering a search term that can include, e.g., the channel name and number and program name. An image returned by the search, typically the first image in the search results since it is likeliest to be most relevant, is obtained and saved locally at block 126. In the event that an image already exists in local storage for the channel under test that image is simply indicated as being the image to use for the corresponding image frame 44 of the IBPG. It is then determined at decision diamond 128 whether an additional channel in the IBPG requires testing for an image and if so the logic loops back to decision diamond 122. Otherwise, the logic ends at state 130.

Figure 13:
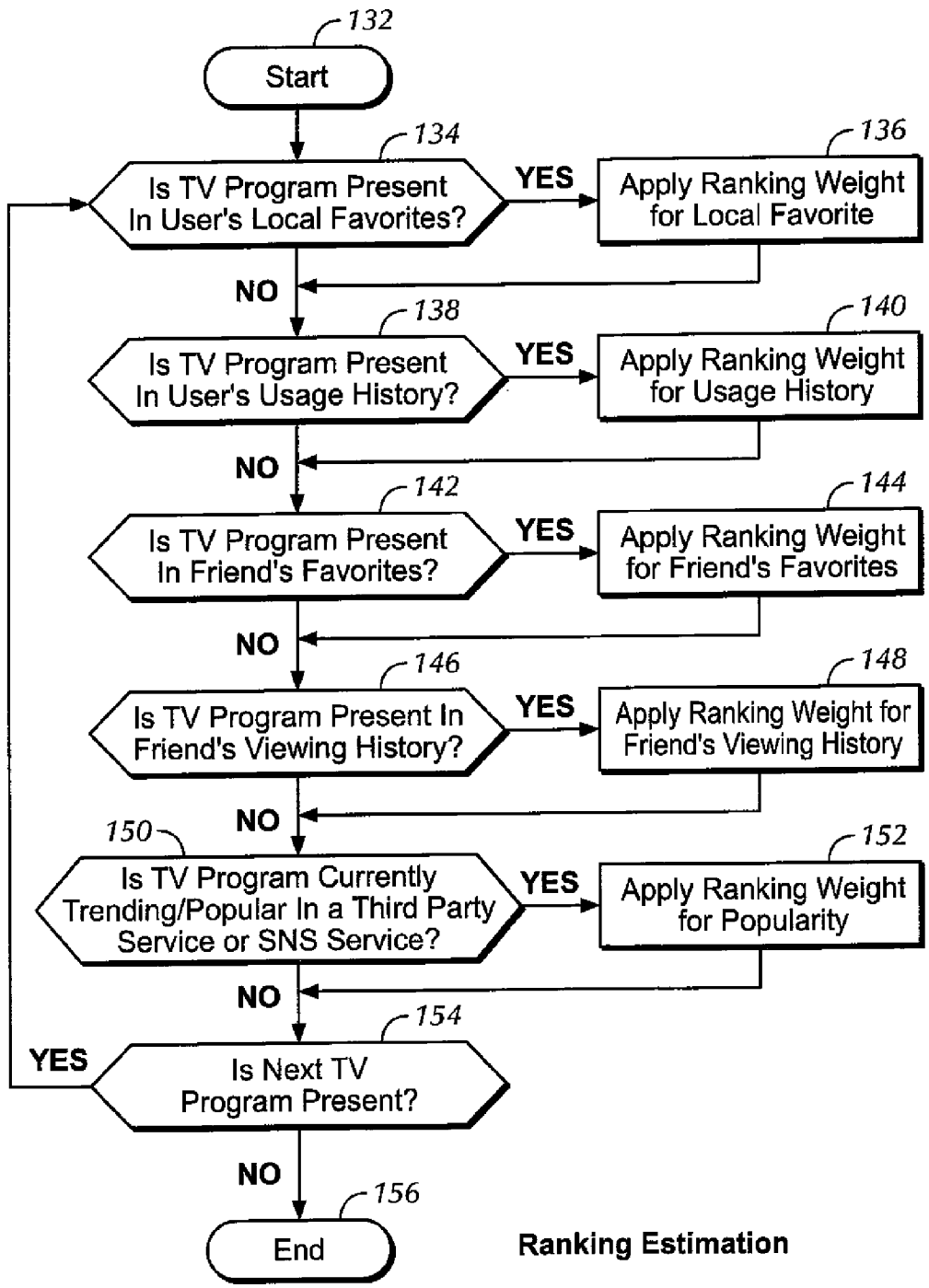

FIG. 13 illustrates the logic for weighting the programs on the EPG in deriving the IBPG. Commencing at start state 132, the logic moves to decision diamond 134 to determine whether the program/channel under test has been previously designated as a user favorite. Responsive to a determination that it has, the logic moves to block 140 to apply a user favorites weight to the program/channel. From block 140 or from decision diamond 134 if the test there was negative, the logic flows to decision diamond 138.

At decision diamond 138, the logic determines whether the program/channel under test is present in a user history data structure. Channels/programs may be added to the user history data structure if, for example, the channel/program has been tuned to in the past X hours a predetermined number N times, where X and N are integers that may be default numbers and/or user-selected numbers entered by means of a setup menu. Responsive to a determination that the program/channel is in the user history data structure, the logic moves to block 140 to apply a user history weight to the program/channel. From block 140 or from decision diamond 138 if the test there was negative, the logic flows to decision diamond 142.

At decision diamond 142, the processor 34 executing the logic determines whether the program/channel under test has been previously designated as a friend favorite. This may be done by accessing a social networking friend database in the memory 36 or over the Internet to determine if any of the user's social networking friends has designated the channel/program a "favorite". Responsive to a determination that it has, the logic moves to block 144 to apply a friend favorites weight to the program/channel. From block 144 or from decision diamond 142 if the test there was negative, the logic flows to decision diamond 146.

At decision diamond 146, the logic determines whether the program/channel under test is present in a friend history data structure. Channels/programs may be added to the friend history data structure if, for example, the channel/program has been tuned to in the past X hours a predetermined number N times by a friend on a social networking site, where X and N are integers that may be default numbers and/or user-selected numbers entered by means of a setup menu. Responsive to a determination that the program/channel is in the friend history data structure, the logic moves to block 148 to apply a friend history weight to the program/channel. From block 148 or from decision diamond 146 if the test there was negative, the logic flows to decision diamond 150.

At decision diamond 150, the logic determines whether the program/channel under test is trending positive on, e.g., a third party rating service available over the Internet or on a social networking site as indicated by the number of "likes" accorded the program/channel, and/or based on the total number of social network comments such as tweets pertaining to the program/channel under test. A threshold may be used, e.g., over 100 likes or over ten likes in the past hour, for example, could result in a positive test at diamond 150. Responsive to a determination that the program/channel is popular, the logic moves to block 152 to apply a popularity weight to the program/channel. From block 152 or from decision diamond 150 if the test there was negative, the logic flows to decision diamond 154, where it is determined whether additional programs/channels in the EPG require testing. If so, the next channel is tested by looping back to decision diamond 134. Otherwise, the logic ends at state 156.

It is to be noted that the above weighting may be effected in one of plural ways. In one example, the weights may be different from each other, and/or some weights may be the same as other weights but different from yet other weights. The weights may be additive or, to give even greater importance to a channel/program satisfying multiple weighting criteria, multiplicative.

For example, assume each channel/program starts with a weight of one, which is then multiplied by any weight for which the channel/program has satisfied the respective testing condition to yield a product. Assume that the channel/program satisfies a first condition whose weight is two and a second condition whose weight is three. The resulting products may be added together to arrive at a total weight of five. Or, the resulting products may be multiplied together to arrive at a total weight of six. Note further that instead of weights which result in higher scores, with the top N scoring programs being selected for the IBPG, the inverse concept may be used, i.e., weights whose tests are satisfied can result in lower scores with the bottom N scoring programs being selected for the IBPG.

Figure 14:
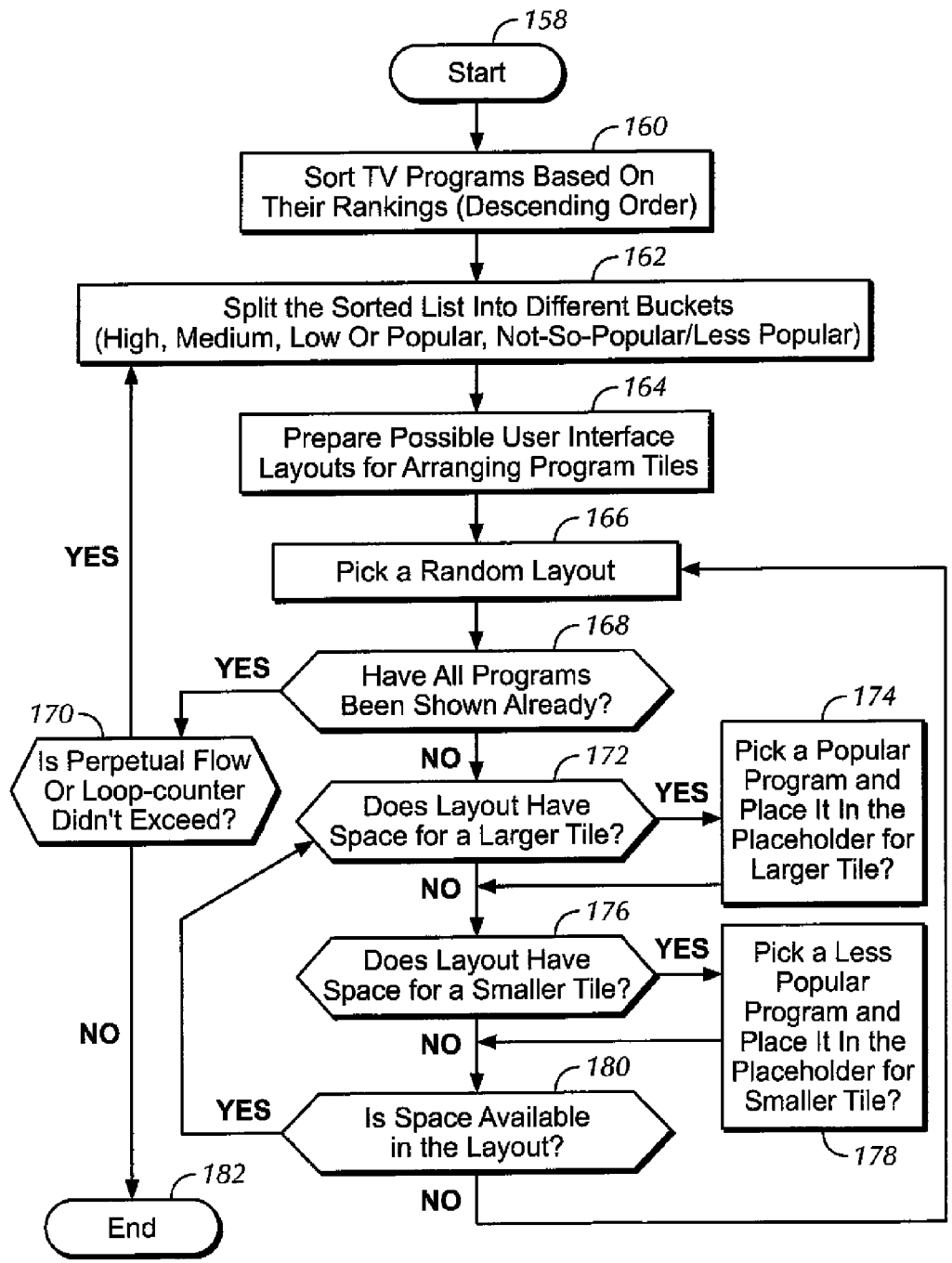

Once the channels/programs in the EPG have been weighted according to FIG. 13, the logic of FIG. 14 starts at state 158 and proceeds to block 160 to sort the programs in order by their total respective weights. If desired, at block 162 the sorted list may be split into segments of most popular (by weight), next most popular, and so on. Then, at block 164 possible layouts, including differing sizes, for the N image frames 44 that constitute the IBPG are generated. This may be done a priori, i.e., multiple layouts may be predefined by the supplier of the control device 14 and stored in memory 36. Or, the processor may simply generate multiple layouts of "N" image frames within certain predefined constraints, e.g., only X % are large, only three rows of smaller frames are permitted, etc.

One of the layouts is selected at random at block 166 and then at decision diamond 168 it is determined whether all programs have been shown already. If so, the logic moves to decision diamond 170 to determine whether a perpetual flow or loop counter has been exceeded and if so the logic ends at state 182. Otherwise, the logic loops back to block 162.

On the other hand, when it is determined at decision diamond 168 that not all the programs have been shown already, the logic moves to decision diamond 172 to determined whether the selected IBPG layout has a space allocated for a larger image frame. If so, one of the programs in the "most popular" segment is selected and its corresponding image frame inserted into the space at block 174.

From block 174 or from decision diamond 172 if the test there was negative, the logic moves to decision diamond 176 to determine whether the selected IBPG layout has a space allocated for a smaller image frame. If so, one of the programs in the "less popular" segment is selected and its corresponding image frame inserted into the space at block 178.

From block 178 or from decision diamond 176 if the test there was negative, the logic moves to decision diamond 180 to determine whether any unfilled spaces exist in the selected IBPG layout. If so, the logic loops back to decision diamond 172, but if not the logic ends at state 182.

Figure 15:
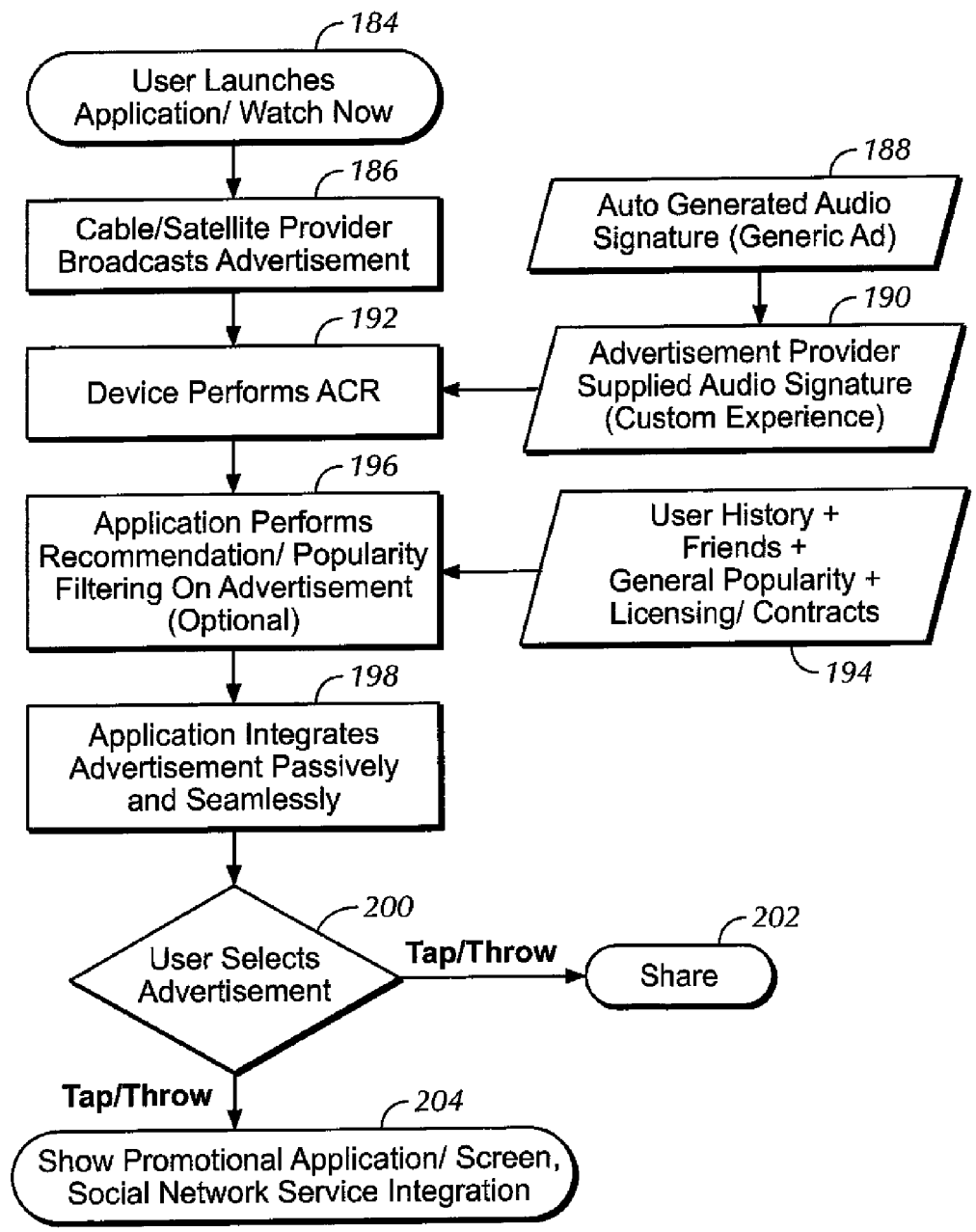
FIG. 15 is a flow chart illustrating an example method for generating advertisements on the image-based program guide.

FIG. 15 illustrates that similar considerations may be applied in selecting advertisements for the IBPG 42. Upon the user launching the IBPG application at state 184 advertisements are received from, e.g., TV signal providers at state 186. Also, generic audio signatures are generated at state 188 for each ad, typically by an ad provider, and at state 190 an additional customized audio signature may also be generated. These signatures are combined so that at state 192 the processor 34 can compare a decoded audio signature from a received ad with the audio signatures from states 188 and 190 to perform ad recognition.

Additionally, at state 194 user history with the particular ad under test, friends' recommendations from social networking sites pertaining to the ad, general popularity of the ad as indicated by the number of likes, for example, on a social networking site, and licensing or contractual arrangements between ad providers and the manufacturer of the control device 14 are obtained. A subset of these may be used. These are then used at block 196 to filter ads by popularity, etc. For example, each ad may be accorded a weight for each of the criteria in block 194 it satisfies similar to the logic for weighting channel/program described above, and only ads satisfying a threshold weight may be passed through the filter of state 196.

At state 198 the selected ads are then added to the IBPG seamlessly and transparently to the user to arrive at the example screen shot of FIG. 9. If it is determined at decision diamond 200 that a user has selected an ad from the IBPG, it may be shared at state 202 according to description above. Or, at state 204 a promotional application or social network integration presentation may be displayed.

It may now be appreciated that the IBPG can be continuously updated according to the logic above and may present image frames representing multiple content types. Note that the direction of automatic scrolling of the IBPG may be different for different devices, e.g., the IBPG may scroll left to right on some devices such as a tablet computer and from bottom to top on other devices such as a smart phone. The sizes of the image frames 44 may be based on relevance and/or popularity, and a user can customize channels/favorites. Animation may be used as described.

If desired, three dimensional scrolling may be used, e.g., in the embodiment described the IBPG may scroll in time in the z-axis. Progressive disclosure of program details is afforded by the above description. Trusted social networking site check-in in the form of accessing known friends lists while sharing as described is effected. The image frames 44 may be real-time images of TV shows and of real-time ads. Because of the graphical nature of the IBPG, there is no need to remember channel numbers to tune to a desired show. If desired, the camera 41A may be used to effect user face recognition to establish an IBPG tailored for that user, and/or to effect room recognition or nearby device logo recognition to present an IBPG tailored for the recognized location.

Multiple sources may be used for alternate image frames 44. Only the top "N" (e.g., 50) channels by weight from the EPG may be used to populate the IBPG, channels may be grouped by number (1-100, 101-200, etc.) to establish the IBPG. The IBPG may include various media types, including TV Shows, live TV, movies, music, books, and games, all of which may be weighted for inclusion on the IBPG as described above.

In weighting a channel/program for inclusion on the IBPG, the following criteria may be used: local favorites, usage history, user's social networking site likes, friend's social networking site likes, user's viewing activity, friend's viewing activity. Popularity/trending information may be provided by $3^{rd}$ party providers, social networking sites (indicated by, e.g., "likes" count, number of followers of a page, check-in count, or a talking_about_count of a particular social networking site.

In some implementations the user's viewing history, e.g., how long a viewer watched a show, can be recorded and a graphic representative thereof presented upon user command. A playlist of TV shows may be queued and liked/similar shows used in preparing the queue, essentially a recommendation engine for recommending future shows based on shows currently in the IBPG.

With further respect to the ad-related logic of FIG. 15, an audio signature is constructed for each advertisement. This signature uniquely identifies the advertisement and allows an application to provide a customized experience for each advertisement. These signatures can be pre-processed by a cloud service or issued by an advertisement provider. The logic collects advertisement information as it relates to the user. This data includes usage history, social network ratings, social network friend ratings, general popularity and possible licensing agreements between device 14 manufacturer and advertisement providers. All information is collected using web service APIs and data logs stored on the local device. Using customizable weighting values for each filter the logic can determine how to display the advertisement, including duration on screen, location on screen, size of image if available, and size of text if available. The logic then determines how to display the results from recognition and recommendation/popularity filtering allowing for many custom UI solutions supporting a single advertisement recognition/filtering library.

Furthermore, the application/advertisement provider can determine what must be done when user interacts with an ad. For example, the user can throw the ad to friend, "like" and/or rate and ad and/or ad provider, and if an ad is for a game, a connection may be established with a social networking friend device to play the game with a friend.

If desired, a software development kit may be published so that additional parties may develop their own advertisement based applications. Crowd-sourcing may be used in which the community is used to generate better deals/promotions from advertisers. Incentives for sharing with friends may be provided. Inline ads spawned from TV/movie scenes may be used.

Figure 16:
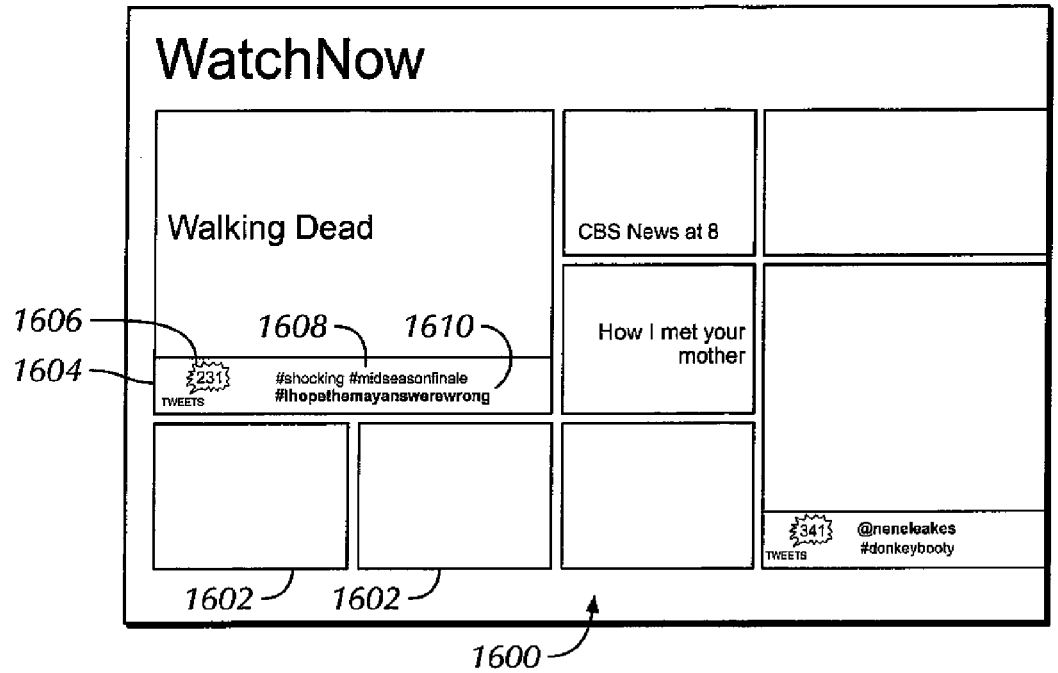
FIGS. 16-25 are screen shots illustrating various example aspects of the image-based program guide incorporating social network information pertaining to TV programs.
Figure 17:
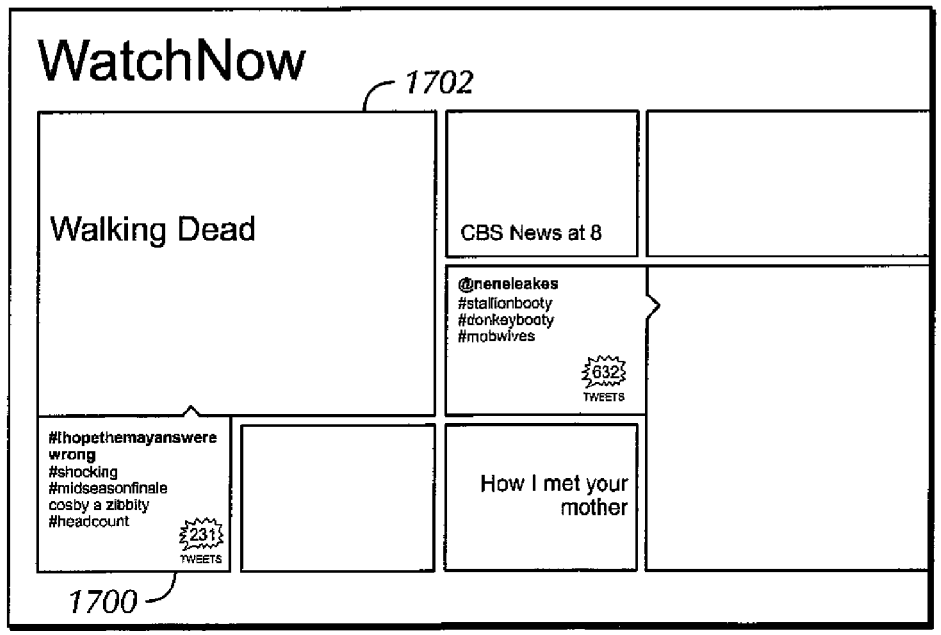

FIGS. 16-25 illustrate that the principles set forth above can be enhanced by providing data from social networking users on the user interface. As shown in FIG. 16, a UI 1600 that can be presented on one or more of the above-described displays includes a grid of variously-sized image frames 1602 representing respective audio video programs such as TV shows. As described above, the sizes of the image frames can depend on the weights they are accorded.

In any case, in addition to the features described previously, one or more image frames 1602 can include social networking information (SNI) pertaining to the program to which the image frame 1602 containing the SNI pertains. Examples of SNI that may be presented in an image frame 1602 includes a numeral 1604, in this case highlighted within a red cloud 1606, indicating a volume of social network comments (such as so-called "tweets") that have been transmitted by social network users concerning the program in, e.g., tweets per minute, tweets per hour, tweets within the last N minutes, etc. The SNI thus can be refreshed every few seconds or every few minutes.

The SNI also may include conversation topics 1608 (such as repeated phrases) within tweets about a show. In the example shown, the conversation topic is established by a social networking hash tag and indicates that the current program is a midseason finale, giving this additional information to a viewer who might otherwise be able to access only a program guide information data structure that would not indicate the program is a midseason finale. The conversation topics and volume numeral 1606 may update periodically in near-real time. It is to be understood that a "tag" in a social network indicates an entry a user may make to access a thread of social networking comments such as "tweets".

In one embodiment, the processor associated with the display that presents the UI 1600 executes an application which obtains the SNI directly from one or more social networking servers. In another embodiment the processor executes the application to obtain the SNI from a server that aggregates social networking information to render information such as the system disclosed in U.S. Pat. No. 8,271,429, incorporated herein by reference. The information is downloaded by the device executing the application periodically or continuously or on an as-needed basis. In one embodiment the SNI is obtained by the device only for the subset of favorites that establish the respective image frames 1602. To obtain SNI for a channel, for instance, that is not in this subset, the user can add the channel to the subset, or command the device to download SNI for that channel. In any case, the SNI typically is correlated to the program or channel to which it pertains by provider of the SNI using, e.g., the principles in the above-incorporated patent.

In addition to the types of SNI noted above and shown in FIG. 16, the SNI can also include a "Top influencers" field in the image frame 1602 which may be established by social networking accounts that message (e.g., tweet) about a show and also reach a wide audience. Also, a "Sentiment" meter can be used depicting positive or negative sentiment about a program based on social networking comments. An "anticipation" meter or other indicator can be presented indicating, based on discussion of a future program in social network comments, that a future program is being more highly anticipated than other programs. Programs with high activity rate as indicated, e.g., by the number 1606 of social network comments about the program may be highlighted onscreen in bold or larger or different color text.

In FIG. 16, the SNI is presented in a SNI pane 1610 that extends along the bottom portion of an image frame 1602 to which the SNI pertains, from the left edge to the right edge of the frame. In contrast, in the embodiment shown in FIG. 17, SNI information is presented in a tile 1700 that is attached to a portion of an image frame 1702 without obscuring any part of the image frame 1702 (except for the below-described pointer), in this case by being disposed along the bottom edge of the image frame 1702 and extending along the bottom edge, below the bottom edge, from the left edge of the image frame to around the middle of the image frame. Note that the tile 1700 includes an arrow-like pointer 1704 extending from the tile 1700 into the image frame 1702 to indicate the program to which the SNI in the tile 1700 pertains.

Figure 18:
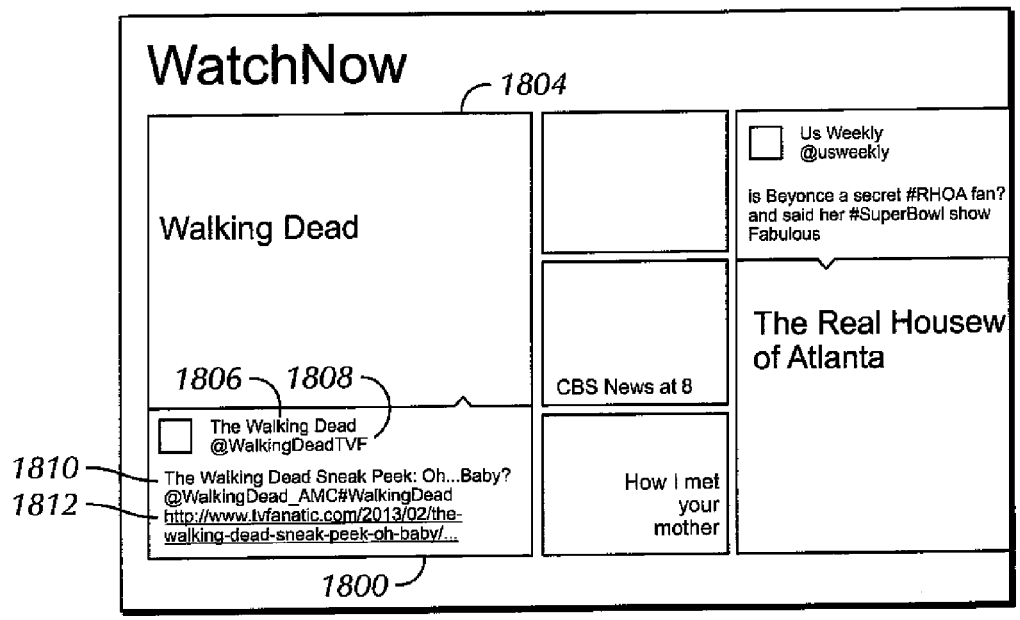

FIG. 18 shows another embodiment in which an SNI tile 1800 contains SNI which, as indicated by the arrow-like indicator 1802, pertains to the program represented by the image frame 1804. In this embodiment the tile 1800 is disposed along the bottom edge of the image frame 1802 and extending along the bottom edge outside of and below the bottom edge, from the left edge of the image frame to the right edge. The SNI tile 1800 includes a title 1806 of the program, along with a social network site address 1808 associated with the program and a message 1810 (such as a tweet) from a top social networking site commenter, referred to as an "influencer" by virtue of, for example, the number of "followers" the influencer has. The SNI may also include a network address 1812 at which a clip or video associated with the program may be viewed, and the user can click on the address 1812 to immediately invoke a browser to play the clip. Note that in one embodiment, the network address 1812 may be obtained automatically by the device by, transparently to the user, entering one or more terms from the SNI into a general Internet search engine and/or a specific video site search engine, with the first "N" results (N≥1) which are returned being presented in the tile 1800 as the network address 1812.

Figure 19:
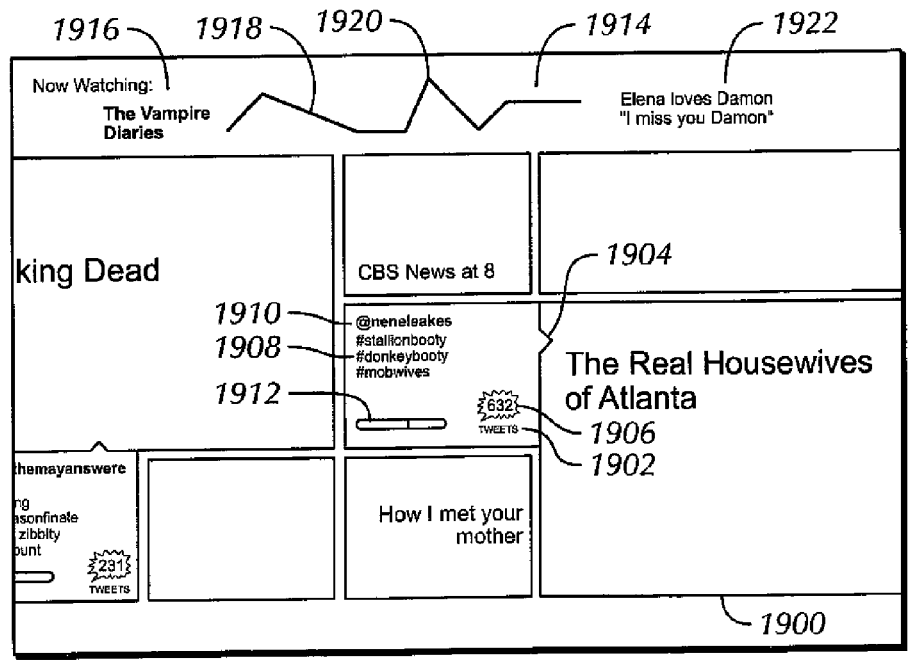

FIG. 19 shows an embodiment which extends the principles above in example ways as follows. For a first image frame 1900 representing a first program, an SNI tile 1902 with program pointer 1904 is arranged along the upper portion of the left edge of the image frame 1900, outside of the image frame 1900. The SNI tile 1902 includes an indicator 1906 indicating how many social networking site comments were made pertaining to the program in the last "N" minutes or hours, plural social networking tags 1908, a social networking site address 1910 associated with the program and/or an actor in the program, and a color-coded popularity bar 1912 divided into color-coded segments. The color code for negative comments may be red, for positive comments green, and for neutral comments white in non-limiting examples, with the lengths of each of the segments being proportional (e.g., directly proportional) to the fraction of comments in the overall number of comments indicated at 1902 that are evaluated as being in the category corresponding to the segment.

Additionally, in a tuned-to program SNI pane 1914 which may appear on the display above the image panes from the left edge to the right edge of the display as shown, SNI corresponding to the currently tuned-to program is presented. The tuned-to program SNI pane 1914 may include a title 1916 of the tuned-to program and a time-based graph 1918 in which time is along the horizontal axis and a volume of social networking comments (e.g., tweets) pertaining to the tuned-to program is represented in the up and down axis. Thus, the higher the point appears on the graph 1918, the larger number of comments were recorded during that time. The processor controlling the display may respond to a user click or touch on a part of the graph 1918, e.g., on a peak 1920, by causing a recording device associated with the display and recording the tuned-to program to immediately rewind to the time of the program corresponding to the time of the selected part of the graph 1918, presenting the program from that point forward. In this way the user can leverage an inference that a spike in social network comments at a particular pint in a program indicates an important or popular otherwise desirable part of the program to view.

If desired, the tuned-to program SNI pane 1914 may also include topics 1922 within the program that are trending toward more popularity from less popularity. Again, these trends may be divined by the social networking sites or social networking aggregator using, for example, word recognition or other means such as those described in the above-referenced patent.

Figure 20:
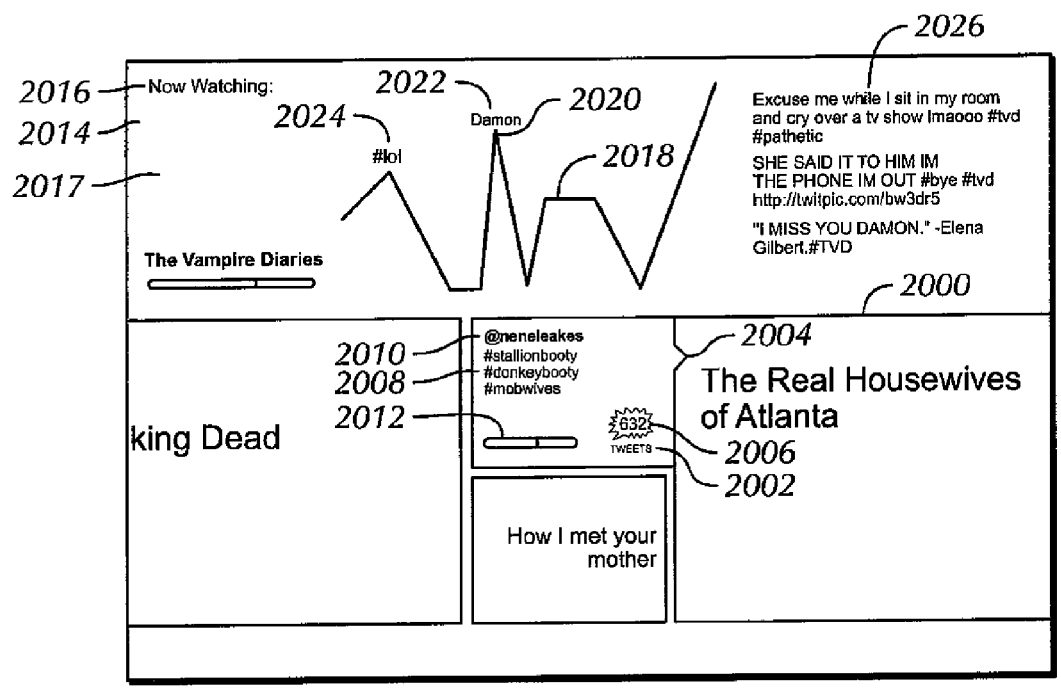

FIG. 20 shows yet another embodiment in which, for a first image frame 2000 representing a first program, an SNI tile 2002 with program pointer 2004 is arranged along the upper portion of the left edge of the image frame 2000, outside of the image frame 2000. The SNI tile 2002 includes an indicator 2006 indicating how many social networking site comments were made pertaining to the program in the last "N" minutes or hours, plural social networking tags 2008, a social networking site address 2010 associated with the program and/or an actor in the program, and a color-coded popularity bar 2012 divided into color-coded segments. The color code for negative comments may be red, for positive comments green, and for neutral comments white in non-limiting examples, with the lengths of each of the segments being proportional (e.g., directly proportional) to the fraction of comments in the overall number of comments indicated at 2002 that are evaluated as being in the category corresponding to the segment.

Additionally, in a tuned-to program SNI pane 2014 which may appear on the display above the image panes from the left edge to the right edge of the display as shown, SNI corresponding to the currently tuned-to program is presented. The tuned-to program SNI pane 2014 may include a title 2016 of the tuned-to program, a still or video thumbnail 2017 of the program, and a time-based graph 2018 in which time is along the horizontal axis and a volume of social networking comments (e.g., tweets) pertaining to the tuned-to program is represented in the up and down axis. Thus, the higher the point appears on the graph 2018, the larger number of comments were recorded during that time. The processor controlling the display may respond to a user click or touch on a part of the graph 2018, e.g., on a peak 2020, by causing a recording device associated with the display and recording the tuned-to program to immediately rewind to the time of the program corresponding to the time of the selected part of the graph 2018, presenting the program from that point forward. In this way the user can leverage an inference that a spike in social network comments at a particular pint in a program indicates an important or popular otherwise desirable part of the program to view.

Peaks on the graph 2020 may be labeled as at 2022 with the name of a subject such as a character or theme that was prominent at the peak time, as indicated by the subject matter of the comments at that time, to better aid the viewer in knowing what the peak part of the program pertained to. The "LOL" comment at 2024 indicates that the SN comments at that point in the program indicated that point was funny, whereas the comment at 2022 represents a character in the program that was a popular topic of SN comments at that point in the show.

If desired, the tuned-to program SNI pane 2014 may also include sample SN comments pane 2026, which includes sample topics from a social networking site. These comments may be selected based on being forwarded to other SN users more frequently than other comments.

Figure 21A:
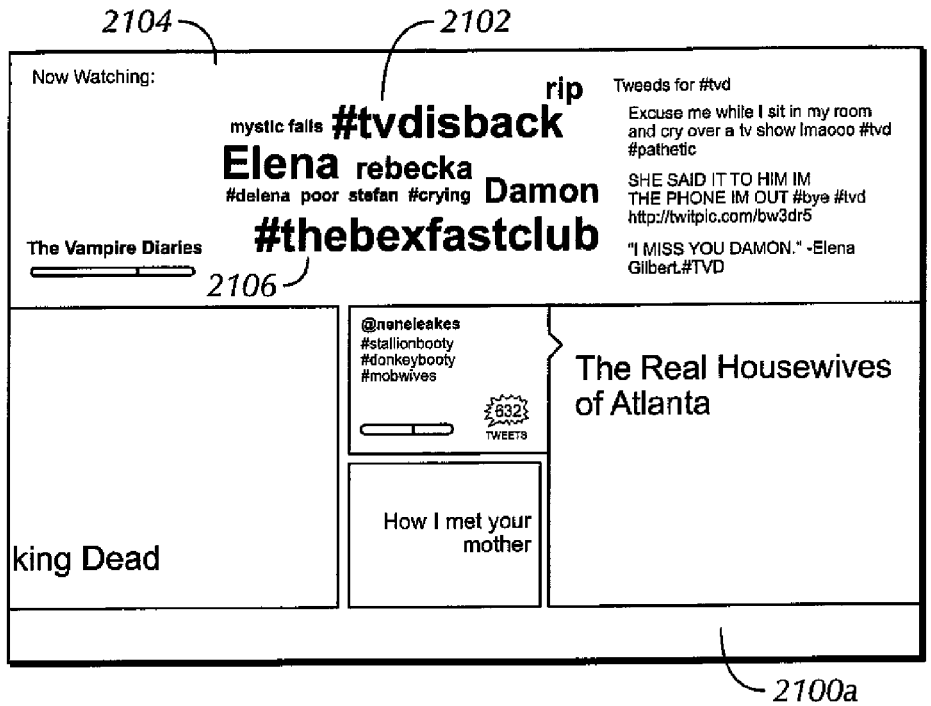
Figure 21B:
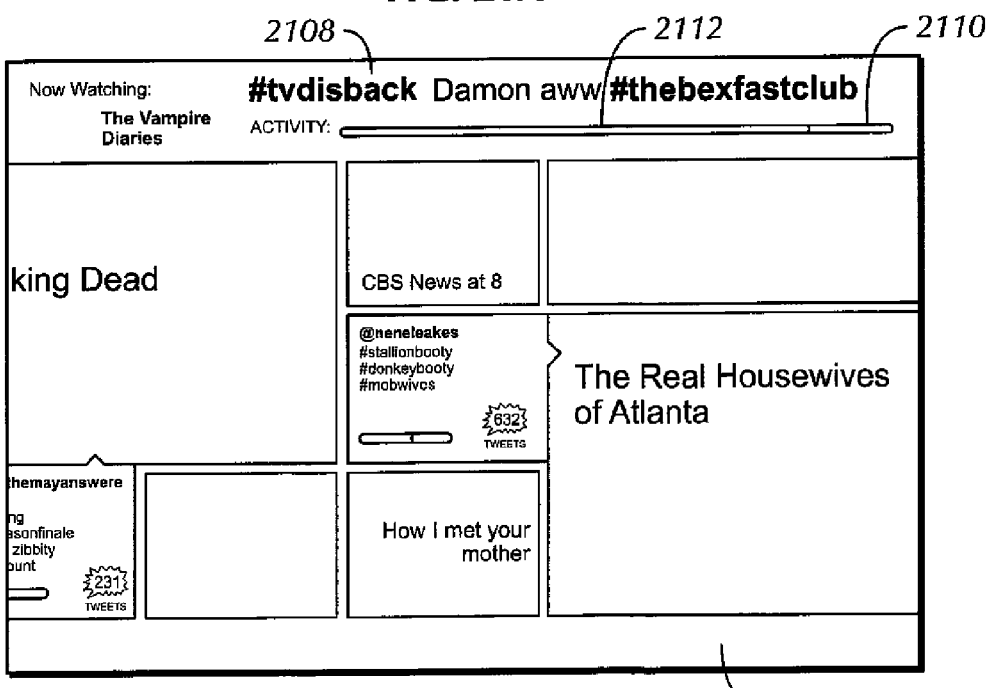

FIG. 21 shows two embodiments of UIs, 2100A and 2100B, which present similar information to the UIs shown in, e.g., FIG. 20, except that in the UI 2100A the SN tags 2102 are presented in a center region of a tuned-to program SNI pane 2104, with tags 2106 having relatively more use (colloquially referred to as "volume") being presented in larger and if desired bolder typeface than tags 2108 having relatively less volume. Note that no time-based graph is shown in FIG. 21. The UI 2100B shows tags 2108 in a single row above an activity bar 2110 that has a colored-in segment 2112 the length of which from left to right indicates the relative social network activity associated with the tuned-to program as indicated, e.g., by a relative number of social networking comments about the program at the current time.

Figure 22:
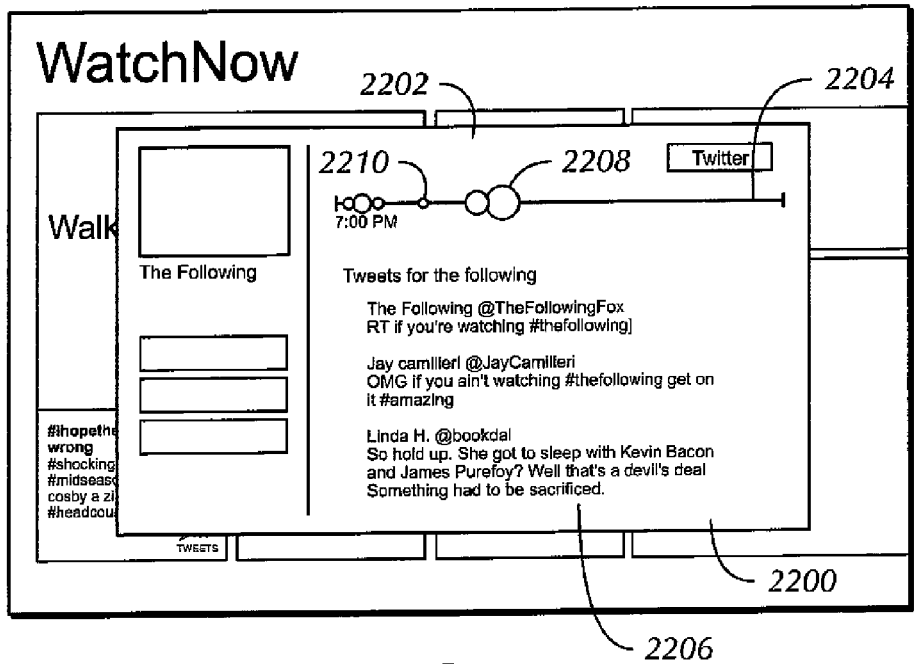

An alternate way to show SN volume pertaining to a program is shown in FIG. 22. A detailed SN window 2200 may be overlaid on the image frames as shown, e.g., in response to a user double tapping or double clicking or otherwise selecting for further information an element in one of the tuned-to program SNI panes described previously. Tabs 2202 may be presented for selecting information on cast and crew, show description, or social networking information, in the example shown, Twitter, which tab has been selected by the user to present a timeline 2204 of SN comment volume and below it a string 2206 of SN comments, which may be selected based on being the most forwarded ("re-tweeted") SN comments among SN users. High volume for a particular time in the program is shown on the timeline 2204 by relatively large circles 2208, with smaller volume being represented by smaller circles 2210. A user can click on or otherwise select a point on the timeline 2204, such as a large SN comment volume part of the show, to cause a recorded associated with the display to rewind to the corresponding time in the program and replay the program from there. The user can skip ahead by selecting a point on the time line that is past the current part of the program being played, in the example, by selecting a point on the time line to the right of the current program position.

Figure 23:
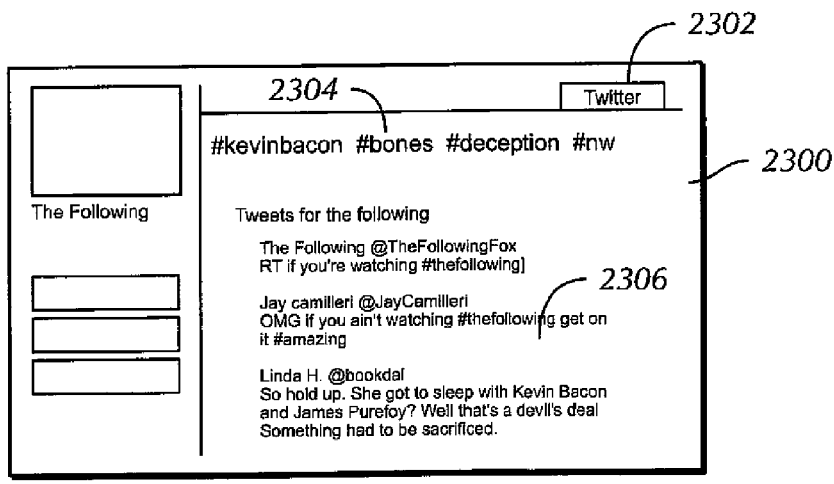

FIG. 23 shows a detailed SN window 2300 that may be overlaid on the image frames, e.g., in response to a user double tapping or double clicking or otherwise selecting for further information an element in one of the tuned-to program SNI panes described previously. Tabs 2302 may be presented for selecting information on cast and crew, show description, or social networking information, in the example shown, Twitter, which tab has been selected by the user to present one or more SN topics 2304 as indicated, e.g., by hash tags, associated with SN comments related to the program. A user can select one of the tags 2204 to cause a string of SN comments 2206 to appear below the topics 2304, with the comments 2206 relating to the selected topic. Which comments to show may be selected based on being the most forwarded ("re-tweeted") SN comments among SN users, as an example.

Figure 24:
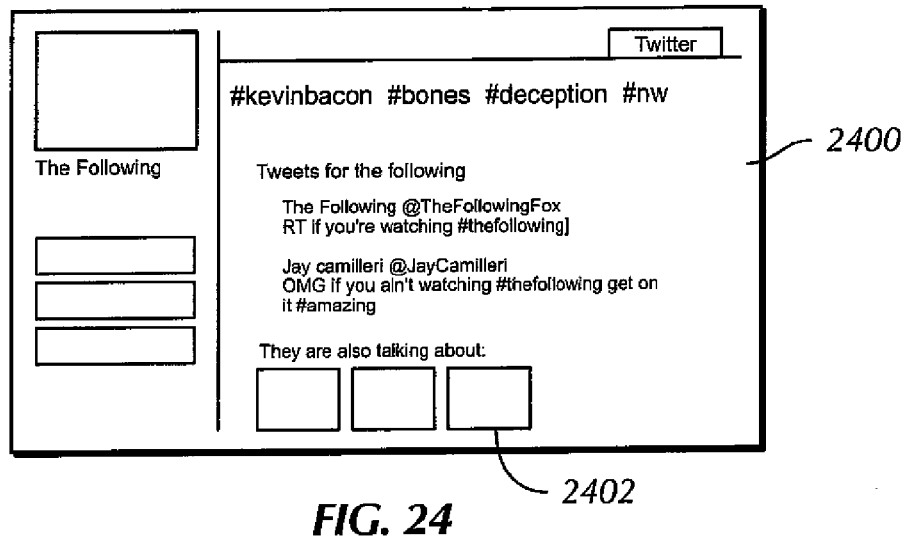

FIG. 24 shows a UI 2400 similar to the one shown in FIG. 23, with the addition of ancillary topic indicators 2402. These topic indicators indicate that users who commented, as by "tweeting", on the selected topic related to the program also frequently commented on the topics indicated by the ancillary topic indicators 2402. The correlation of the ancillary topic comments to the program topics can be done by a third party service that examines and tracks comments in the SN. The third party service provides the information to populate the ancillary topic indicators 2402 to the device.

Figure 25:
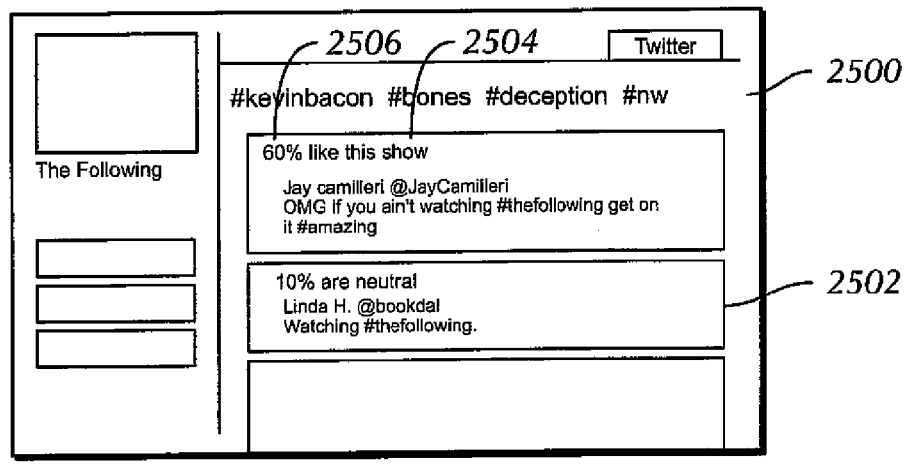

FIG. 25 shows a UI 2500 similar to the one shown in FIG. 23, with the addition of sentiment indications. Specifically, SN comments about the program are presented in SN comment window 2502 and are grouped by sentiment category, from "like" to "neutral" to "dislike" in the example shown, from top to bottom. The sentiment indicators may include an alphanumeric indication 2504 for each category, a numeric indicator 2506 for each category indicating the percentage of comments in that category, and if desired a color code, e.g., "like" category comments may appear over a green field, neutral over a white field, and dislike over a red field. SN comments can be categorized by the SN sites and/or by a SN comment aggregator using word recognition rules, e.g., "LOL" in a comment can be inferred to be "like" while comment terms like "disappointment" can be classified as dislike, with comments not containing like/dislike trigger terms being classified as neutral.

Note that in any of the UIs above the user may be given the option of tailoring the amount of content presented in the UI. For example, from a setup screen the user may be able to define how many of the most popular tweets are to be presented, e.g., one, two, or three. The user may also be enabled to define which social networking sites from which the SNI is to be derived, e.g., Site A only, site A and site B, or all available SN sites. The user may further be presented with templates of multiple SN UIs, e.g., from the above-described embodiments, and select the UI layout desired by the user.

Figure 26:
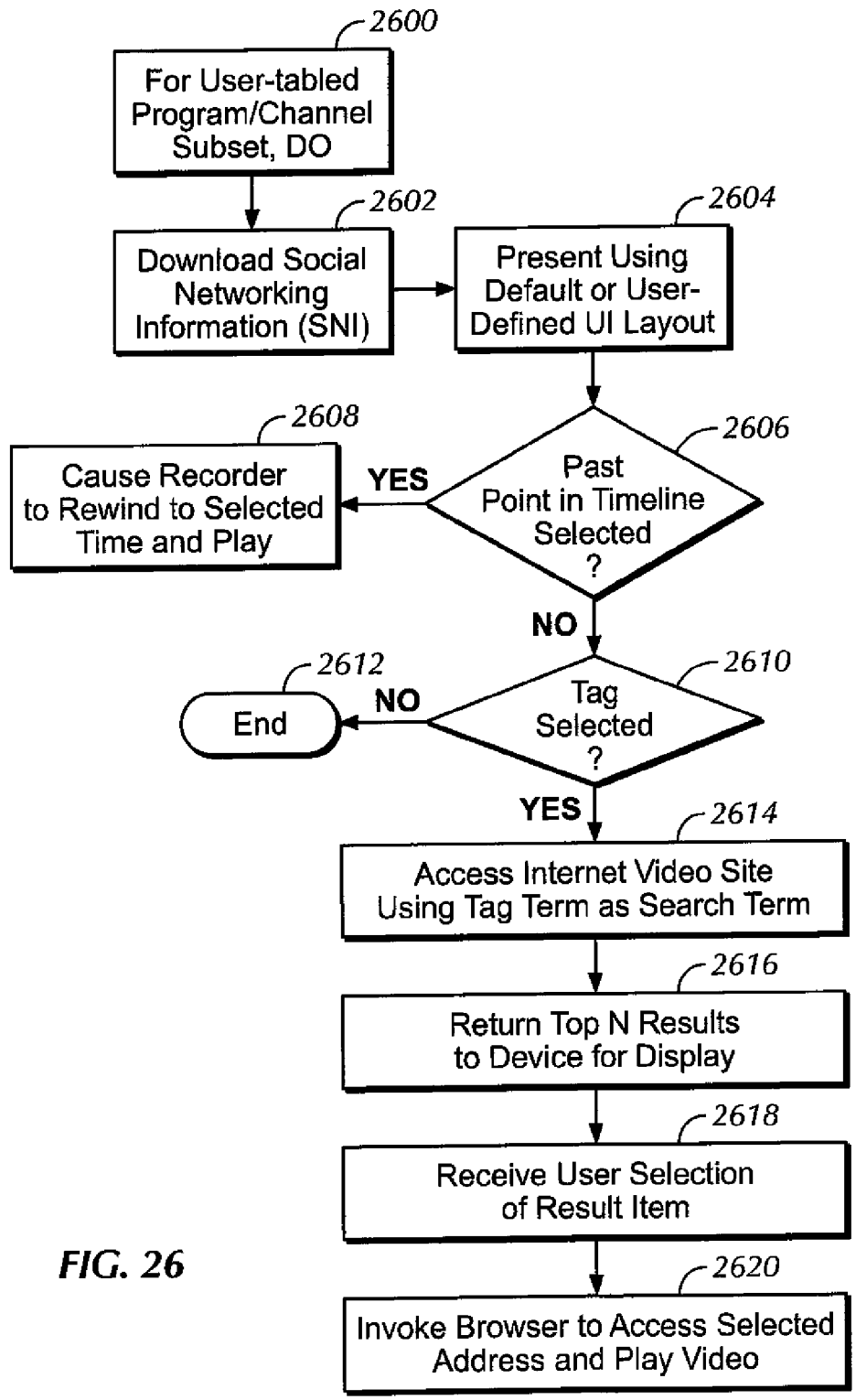
FIG. 26 is a flow chart of example logic related to social networking (SN) aspects shown in FIGS. 16-25.

FIG. 26 illustrates in flow chart format aspects of logic embodied in FIGS. 16-25. The logic may be executed by one or more processors such as the display device processor 20 and/or control device processor 34 shown in FIG. 1, accessing instructions on respective computer readable storage media such as the display medium 22 and/or control device medium 36, to control a display (such as the display device display 16 and/or control device display 32) to establish one or more the UIs shown and described above.

Commencing at block 2600, for each of at least some and preferably all of the programs/channels on the IBPG described above, the logic moves to block 2602 to obtain one or more elements of the SNI described above. If desired, downloaded activity counts as measured by, e.g., number of tweets within the past N minutes can be provided to a trending weighting algorithm such as executed at steps 150 and 152 in FIG. 13 described previously.

Moving to block 2604, the SNI is presented on one of the example UIs shown in FIGS. 16-25. As discussed earlier, one or more of the UIs may be used by default, or a user may be given the option of selecting a particular UI layout and/or the type and amount of SNI presented.

Decision diamond 2206 indicates that responsive to a viewer selecting a past point in a program by, e.g., clicking on a point in the timeline 1918 of FIG. 19 or the timeline 2018 of FIG. 20 or the timeline 2204 of FIG. 22, the logic proceeds to block 2608 to cause a recorded communicating with the device being employed to skip back in the program associated with the timeline to the point in time represented by the clicked point in the timeline, replaying the program forward at normal speed if desired from there. The user can watch a period of the program and then if desired click on the rightmost (current time) part of the timeline to skip forward to watch the current program broadcast in real time.

The logic may also flow to decision diamond 2610 which indicates that responsive to a user selecting a SNI topic (e.g., a hashtag) or a SNI comment (e.g., a tweet), the logic moves to block 2614 to use the selected SNI item as a search term to search a wide area network or portion thereof for video content based on the search term. For example, a web browser may be invoked by the executing processor and a general search engine accessed using the search term to return results from the Internet. Or, a predetermined Internet video site, either free and/or a pay site with which the user has indicated he has an account, may be searched using the search term. The top "N" results are received at block 2616 and presented on the display, wherein "N" is an integer equal to or greater than one. For example, in FIG. 18 only a single result has been returned as the network address 1812. It is to be understood that instead of returning the top "N" results, other filtering criteria can be applied to the results set from the query.

Note that the logic of states 2614 and 2616 can be executed automatically responsive to user selection of a tag at state 2610. Once the result has been presented at block 2616, a user selection of one of the result items presented on the display may be received at block 2618, with a browser and/or media player or other appropriate application being invoked automatically at block 2620 to access the video represented by the selected result item and download and play the video on the display.

Figure 27A:
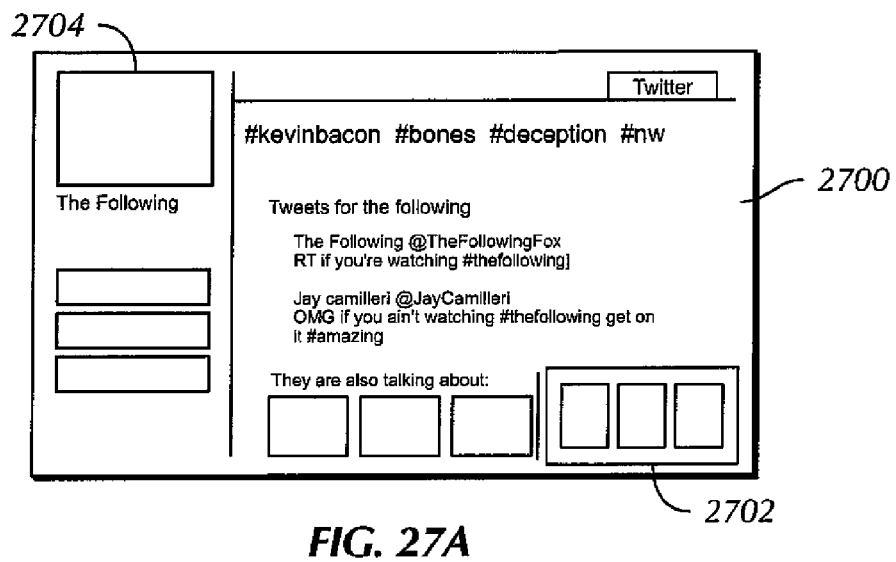
FIG. 27 shows two screen shots tied to advertising.
Figure 27B:
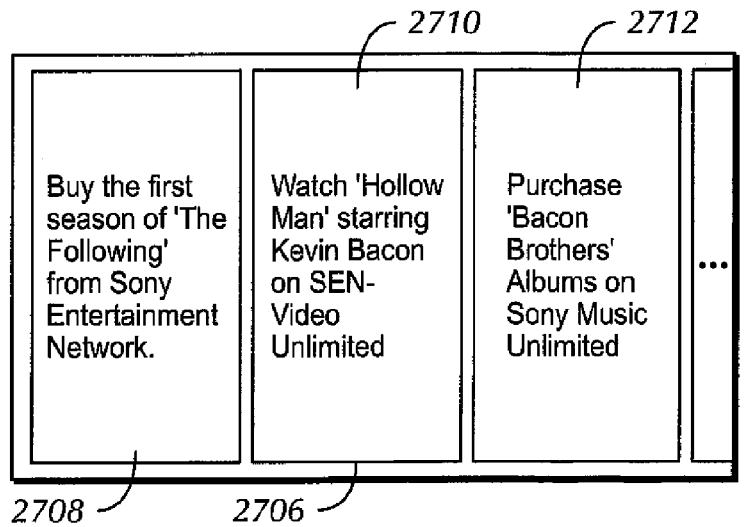

FIG. 27 illustrates on the left a screen shot of a UI 2700 similar to the UI shown in FIG. 24, with the addition of thumbnails 2702 of three sales offers in the lower right hand portion of the UI that offer products related to the current video represented in the current video pane 2704. The offered products may be an episode of the current video or videos in which the same person starring in the current video in the pane 2704 also stars. The offers may also pertain to content partners, content services, and advertisements can come from advertisement partners.

Selection of the thumbnails 2704 can cause the enlarged presentation of the UI 2706 shown on the right of FIG. 27. A first offer 2708 is for an episode of the current video in the pane 2704, a second offer 2710 is an offer to view a video starring the same actor who appears in the current video in the pane 2704, and a third offer 2712 is to purchase music by the same actor who appears in the current video in the pane 2704.

While the particular INTUITIVE IMAGE-BASED PROGRAM GUIDE FOR CONTROLLING DISPLAY DEVICE SUCH AS A TELEVISION is herein shown and described in detail, it is to be understood that the subject matter which is encompassed by the present invention is limited only by the claims.

What is claimed is:

1. A device comprising:
   at least one processor; and
   at least one computer readable storage medium accessible to the processor and bearing instructions executable by the processor to cause the processor to, for at least one video program:
   establish a respective image;
   access a wide area network to obtain social networking information (SNI) related to the video program;
   juxtapose at least some of the SNI related to the video program with the image;
   use at least some of the SNI as a search term to access a computer network with a query based on the search term and present on a display at least one search result item selectable by a user to access and play a video represented by the result item; and/or
   present on the display at least one time-based graph illustrating a volume of social networking comments pertaining to the program as a function of time, a user selection of a part of the graph causing a recording device associated with the display and recording the program to play back the program starting at a time represented by the part of graph selected by the user.

2. The device of claim 1, wherein the image is selectable to cause an AV program associated with the image to be presented on the display.

3. The device of claim 1, wherein instructions when executed by the processor configure the processor to establish respective photograph-based images for plural programs and arranges the images in an image based program guide (IBPG).

4. The device of claim 1, wherein the SNI includes a numeral indicating a volume of social network comments that have been transmitted by social network users concerning the video program.

5. The device of claim 1, wherein the SNI includes at least one conversation topic related to the program.

6. The device of claim 5, wherein the conversation topic is established by a social networking hash tag.

7. The device of claim 1, wherein, the instructions when executed by the processor configure the processor to obtain the SNI directly from one or more social networking servers.

8. The device of claim 1, wherein the instructions when executed by the processor configure the processor to obtain the SNI from a server that aggregates social networking information.

9. The device of claim 1, wherein the SNI includes at least a "Top influencers" field established by at least one social networking account messages from which reach a relatively wide audience.

10. The device of claim 1, wherein the SNI includes at least a "Sentiment" meter depicting positive and/or negative sentiment about the program based on social networking comments.

11. The device of claim 1, wherein the instructions when executed by the processor configure the processor to present the SNI in a SNI pane that extends along a bottom portion of the image to which the SNI pertains, at least partially overlaying the image.

12. The device of claim 1, wherein the instructions when executed by the processor configure the processor to present the SNI in a SNI pane that is attached to a portion of the image frame substantially without obscuring any part of the image.

13. The device of claim 1, wherein the instructions when executed by the processor configure the processor to use at least some of the SNI as a search term to access a computer network with a query based on the search term and to present on the display at least one search result item selectable by a user to cause the processor to access and play a video represented by the result item.

14. The device of claim 1, wherein the instructions when executed by the processor configure the processor to present on the display at least one time-based graph illustrating a volume of social networking comments pertaining to the program as a function of time.

15. A device comprising:
at least one processor; and
at least one computer readable storage medium accessible to the processor and bearing instructions executable by the processor to cause the processor to, for at least one video program:
establish a respective image;
access a wide area network to obtain social networking information (SNI) related to the video program;
juxtapose at least some of the SNI related to the video program with the image;
present on a display at least one time-based graph illustrating a volume of social networking comments pertaining to the program as a function of time; and
respond to a user selection of a part of the graph by causing a recording device associated with the display and recording the program to immediately play back the program starting at a time represented by the part of the graph selected by the user.

16. The device of claim 14, wherein the instructions when executed by the processor configure the processor to juxtapose with at least one peak on the graph an associated alphanumeric label derived from the SNI.

17. The device of claim 1, wherein the instructions when executed by the processor configure the processor to user selection of a topic by causing a string of social networking comments to be presented on the display, the string of social networking comments being related to the topic.

18. Method, comprising:
presenting a scrollable arrangement of images on a display of a device, the images establishing an image-based program guide (IBPG) on the display;
the images representing respective channels in an electronic program guide (EPG) from a TV signal provider;
presenting social networking information (SNI) related to a video program on or adjacent an image in the IBPG representing the program;
using at least some of the SNI as a search term to access a computer network with a query based on the search term and presenting on the display at least one search result item selectable by a user to access and play a video represented by the result item; and/or
presenting on the display at least one time-based graph illustrating a volume of social networking comments pertaining to the program as a function of time, a user selection of a part of the graph causing a recording device associated with the display and recording the program to play back the program starting at a time represented by the part of graph selected by the user.

19. A device comprising:
at least one processor;
at least one computer memory with instructions executable by the processor to configure the processor to:
present a scrollable image-based program guide (IBPG) on a display;
present social network information (SNI) pertaining to at least one program represented in the IBPG on the display;
use at least some of the SNI as a search term to access a computer network with a query based on the search term and presenting on the display at least one search result item selectable by a user to access and play a video represented by the result item; and/or
present on the display at least one time-based graph illustrating a volume of social networking comments pertaining to the program as a function of time, a user selection of a pant of the graph causing a recording device associated with the display and recording the program to play back the program starting at a time represented by the part of graph selected by the user.

20. The device of claim 19, wherein the instructions when executed by the processor configure the processor to use at least some of the SNI as a search term to access a computer network with a query based on the search term and presenting on the display at least one search result item selectable by a user to access and play a video represented by the result item.

21. The device of claim 19, wherein the instructions when executed by the processor configure the processor to present on the display at least one time-based graph illustrating a volume of social networking comments pertaining to the program as a function of time, a user selection of a part of the graph causing a recording device associated with the display and recording the program to play back the program starting at a time represented by the part of graph selected by the user.

22. The device of claim 1, wherein the instructions when executed by the processor configure the processor to use at least some of the SNI as a search term to access a computer network with a query based on the search term and presenting on the display at least one search result item selectable by a user to access and play a video represented by the result item.

23. The device of claim 1, wherein the instructions when executed by the processor configure the processor to present on the display at least one time-based graph illustrating a volume of social networking comments pertaining to the program as a function of time, a user selection of a part of the graph causing a recording device associated with the display and recording the program to play back the program starting at a time represented by the part of graph selected by the user.

24. The method of claim 18, comprising:
using at least some of the SNI as a search term to access a computer network with a query based on the search term and presenting on the display at least one search result item selectable by a user to access and play a video represented by the result item.

25. The method of claim 18, comprising:
presenting on the display at least one time-based graph illustrating a volume of social networking comments pertaining to the program as a function of time, a user selection of a part of the graph causing a recording device associated with the display and recording the program to play back the program starting at a time represented by the part of graph selected by the user.

* * * * *